US011661867B2

(12) United States Patent
Uechi et al.

(10) Patent No.: US 11,661,867 B2
(45) Date of Patent: May 30, 2023

(54) GAS TURBINE EXHAUST HEAT RECOVERY PLANT

(71) Applicant: MITSUBISHI HEAVY INDUSTRIES, LTD., Tokyo (JP)

(72) Inventors: Hideyuki Uechi, Tokyo (JP); Eisaku Ito, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 267 days.

(21) Appl. No.: 16/775,559

(22) Filed: Jan. 29, 2020

(65) Prior Publication Data
US 2020/0284169 A1 Sep. 10, 2020

(30) Foreign Application Priority Data

Mar. 7, 2019 (JP) .............................. JP2019-041599

(51) Int. Cl.
*F02C 6/18* (2006.01)
*F01K 23/10* (2006.01)

(52) U.S. Cl.
CPC .............. *F01K 23/106* (2013.01); *F02C 6/18* (2013.01); *F05D 2220/72* (2013.01); *F05D 2220/76* (2013.01); *F05D 2260/2322* (2013.01); *F05D 2260/85* (2013.01); *F05D 2270/303* (2013.01)

(58) Field of Classification Search
CPC ........... F01K 23/10; F01K 23/106; F02C 6/18
See application file for complete search history.

(56) References Cited

U.S. PATENT DOCUMENTS

| 4,437,313 A | * | 3/1984 | Taber ..................... F01K 23/101 60/39.182 |
| 4,550,379 A | * | 10/1985 | Kawai ..................... F01K 13/02 700/287 |
| 5,727,377 A | * | 3/1998 | Fetescu ................. F01K 21/042 60/775 |

(Continued)

FOREIGN PATENT DOCUMENTS

| JP | 51-035835 | 3/1976 |
| JP | 03-00908 | 1/1991 |

(Continued)

OTHER PUBLICATIONS

Murad A. Rahim, Combined Cycle Power Plant Performance Analyses Based on the Single-Pressure and Multipressure Heat Recovery Steam Generator, 2012, Journal of Energy Engineering, vol. 138, No. 3, Sep. 1, 2012, pp. 136-145. (Year: 2012).*

*Primary Examiner* — Todd E Manahan
*Assistant Examiner* — Marc J Amar
(74) *Attorney, Agent, or Firm* — Wenderoth, Lind & Ponack, L.L.P.

(57) ABSTRACT

A gas turbine exhaust heat recovery plant includes a plurality of gas turbine exhaust heat recovery devices that have a gas turbine and an exhaust heat recovery boiler for generating steam by recovering exhaust heat of the gas turbine, a steam-utilizing facility that utilizes the steam generated by the exhaust heat recovery boiler, and an inter-device heat medium supply unit capable of supplying a portion of water heated or a portion of the steam generated by at least one of the gas turbine exhaust heat recovery devices out of the plurality of gas turbine exhaust heat recovery devices, to the other gas turbine exhaust heat recovery device.

13 Claims, 20 Drawing Sheets

(56) References Cited

U.S. PATENT DOCUMENTS

| | | | |
|---|---|---|---|
| 6,178,734 B1* | 1/2001 | Shibuya | F02C 7/16 60/772 |
| 2008/0000237 A1* | 1/2008 | Briesch | F02C 6/00 60/772 |
| 2010/0180567 A1* | 7/2010 | Nattanmai | F02C 6/18 60/39.182 |
| 2010/0236240 A1* | 9/2010 | Hu | F02C 6/18 60/670 |
| 2010/0305768 A1* | 12/2010 | Holt | F01K 13/02 60/39.182 |
| 2011/0036096 A1* | 2/2011 | Bommareddy | F01K 23/106 60/780 |
| 2012/0036828 A1* | 2/2012 | Hu | F02C 6/18 60/39.182 |
| 2012/0317973 A1* | 12/2012 | Gulen | F01K 23/101 60/597 |
| 2013/0111921 A1 | 5/2013 | Rajesh et al. | |
| 2014/0216363 A1* | 8/2014 | Rancruel | F01K 23/10 122/406.4 |
| 2017/0350279 A1* | 12/2017 | Kobayashi | F01K 23/10 |

FOREIGN PATENT DOCUMENTS

| | | |
|---|---|---|
| JP | 04-272409 | 9/1992 |
| JP | 08-189308 | 7/1996 |
| JP | 2004-027886 | 1/2004 |
| WO | WO-2019198756 A1 * 10/2019 | ............... F22B 1/18 |

* cited by examiner

GAS TURBINE EXHAUST HEAT RECOVERY PLANT

BACKGROUND OF THE INVENTION

Field of the Invention

This invention relates to a gas turbine exhaust heat recovery plant.

Priority is claimed on Japanese Patent Application No. 2019-041599, filed on Mar. 7, 2019, the content of which is incorporated herein by reference.

Description of Related Art

Japanese Unexamined Patent Application, First Publication No. H3-000908 discloses a combined cycle power generation facility serving as a gas turbine exhaust heat recovery plant that combines a gas turbine and a steam turbine with each other so as to recover exhaust heat from the gas turbine. According to the combined cycle power generation facility configured in this way, exhaust gas exhausted from the gas turbine is introduced into an exhaust gas boiler.

The exhaust gas boiler generates steam by utilizing heat of the exhaust gas of the gas turbine. The steam is fed to the steam turbine via a low-pressure drum, a high-pressure drum, and a superheater. The steam turbine is rotated by the steam, and rotational energy thereof is converted into electrical energy by a generator.

SUMMARY OF THE INVENTION

Incidentally, in recent years, it is desirable to effectively use renewable energy such as solar light and wind power. The renewable energy greatly shows considerable output variations. Therefore, it is necessary to adjust a supply/reception balance by rapidly changing an output of the combined cycle power generation facility in response to the output variations in the renewable energy.

However, according to the combined cycle power generation facility disclosed in Japanese Unexamined Patent Application, First Publication No. H3-000908, there is a possibility that a life consumption rate may increase due to thermal stress resulting from sudden output variations in the gas turbine. This invention is made in view of the above-described circumstances and aims to provide a gas turbine exhaust heat recovery plant which can reduce a life consumption rate by suppressing thermal stress resulting from sudden output variations.

In order to solve the above-described problem, the following configurations are adopted.

According to a first aspect of this invention, a gas turbine exhaust heat recovery plant includes a plurality of gas turbine exhaust heat recovery devices, a steam-utilizing facility, and an inter-device heat medium supply unit. The plurality of gas turbine exhaust heat recovery devices have a gas turbine and an exhaust heat recovery boiler for generating steam by recovering exhaust heat of the gas turbine. The steam-utilizing facility utilizes steam generated by the exhaust heat recovery boiler. The inter-device heat medium supply unit is capable of supplying a portion of water heated or a portion of the steam generated by at least one of the gas turbine exhaust heat recovery devices, to at least one of the other gas turbine exhaust heat recovery device and the steam-utilizing facility. According to this configuration, the other gas turbine exhaust heat recovery device can be preheated by utilizing a portion of the water heated or the steam generated by at least one of the gas turbine exhaust heat recovery devices. Therefore, a temperature drop in the other gas turbine exhaust heat recovery device is suppressed. Accordingly, the life consumption rate can be reduced by suppressing thermal stress resulting from sudden output variations.

According to a second aspect of this invention, the inter-device heat medium supply unit according to the first aspect may supply the portion of the water heated by at least one of the gas turbine exhaust heat recovery devices or the portion of the steam generated by at least one of the gas turbine exhaust heat recovery devices, to the exhaust heat recovery boiler of the other gas turbine exhaust heat recovery device. According to this configuration, the exhaust heat recovery boiler of the other gas turbine exhaust heat recovery device can be preheated. Therefore, a temperature drop in in the exhaust heat recovery boiler of the other gas turbine exhaust heat recovery device is suppressed. Accordingly, the life consumption rate can be reduced by suppressing the thermal stress resulting from sudden output variations in the exhaust heat recovery boiler.

According to a third aspect of this invention, the inter-device heat medium supply unit according to the first or second aspect may supply the water heated or the steam generated by the gas turbine exhaust heat recovery device which is in an operation state, to the exhaust heat recovery boiler of the gas turbine exhaust heat recovery device which is in a non-operation state. According to this configuration, the water heated or the steam generated by the gas turbine exhaust heat recovery device which is in an operation state can be utilized. In this manner, it is possible to suppress the temperature drop in the exhaust heat recovery boiler of the gas turbine exhaust heat recovery device which is in a non-operation state. Therefore, the life consumption rate can be reduced in the exhaust heat recovery boiler by suppressing the thermal stress resulting from sudden output variations.

According to a fourth aspect of this invention, the inter-device heat medium supply unit according to any one of the first to third aspects may supply at least one of the water heated and the steam evaporated by an evaporator belonging to the exhaust heat recovery boiler, to an evaporator of the other gas turbine exhaust heat recovery device. According to this configuration, it is possible to reduce the thermal stress by effectively preheating the evaporator which needs a considerable heating time and a temperature difference from the exhaust gas is likely to increase since the evaporator has a large amount of can water and large heat capacity. A temperature of the can water can be raised in advance, and the steam can be generated in a short time. In addition, it is possible to increase a steam generation amount in a short time.

According to a fifth aspect of this invention, the inter-device heat medium supply unit according to the fourth aspect may supply at least one of the water heated and the steam evaporated by a highest-pressure evaporator out of a plurality of evaporators belonging to the exhaust heat recovery boiler, to a highest-pressure evaporator of the other gas turbine exhaust heat recovery device. According to this configuration, the highest-pressure water or steam can be supplied to the highest-pressure evaporator of the other gas turbine exhaust heat recovery device. Therefore, the thermal stress of the evaporator exposed to the highest-temperature exhaust gas can be reduced by suppressing the temperature drop of the evaporator exposed to the highest-temperature exhaust gas. The high-temperature water or the high-temperature steam can be used for preheating. Therefore, for example, the thermal stress can be effectively reduced when the gas turbine is rapidly started up, and an output of the steam turbine can be raised in a short time.

According to a sixth aspect of this invention, the gas turbine exhaust heat recovery device according to any one of the first to fifth aspects may include a steam-utilizing facility driven by the steam and a reheater for reheating the steam used by the steam-utilizing facility. The inter-device heat medium supply unit may supply the steam used by the steam-utilizing facility and reheated by the reheater, to another reheater of the other gas turbine exhaust heat recovery device. According to this configuration, the reheater of other the gas turbine exhaust heat recovery device can be preheated using high-temperature steam superheated by the reheater. Therefore, for example, the thermal stress can be effectively reduced when the gas turbine is rapidly started up, and the output of the steam turbine can be raised in a short time.

According to a seventh aspect of this invention, the inter-device heat medium supply unit according to the third to sixth aspects may supply the steam generated by the gas turbine exhaust heat recovery device which is in an operation state, to the evaporator of the exhaust heat recovery boiler of the gas turbine exhaust heat recovery device which is in a non-operation state, via a superheater or the reheater of the exhaust heat recovery boiler of the gas turbine exhaust the recovery device which is in a non-operation state. According to this configuration, inside the exhaust heat recovery boiler, even when in a non-operation state, through preheating, it is possible to prevent condensation of the steam in the superheater and the reheater in which gas-phase steam flows when in an operation state. Therefore, it is possible to prevent a disadvantage that the pipeline may be blocked due to condensed water, or it is possible to prevent the thermal stress from occurring due to a temperature change caused by water condensation and re-evaporation. When in a non-operation state, the thermal stress can be effectively reduced by preheating the superheater and the reheater which are particularly high-temperature inside the exhaust heat recovery boiler when in an operation state and in which severe thermal stress is likely to occur when these are started up or when a load increases.

According to an eighth aspect of this invention, the exhaust heat recovery boiler of the gas turbine exhaust heat recovery device according to any one of the third to sixth aspects may include a temperature sensor for measuring a temperature of the steam flowing in the exhaust heat recovery boiler, and includes a control device for controlling a degree of superheat of the steam flowing in an involved portion to be higher than 0 and to fall within a prescribed range, based on the steam temperature measured by the temperature sensor of the exhaust heat recovery boiler of the gas turbine exhaust heat recovery device which is in a non-operation state. According to this configuration, the steam can be prevented from having an excessively high temperature or having an excessively low temperature. Therefore, it is possible to suppress an increase in the thermal stress. It is possible to suppress an increase in the thermal stress by preventing the water condensation inside the system and by preventing a temperature change caused by the water condensation and re-evaporation. Furthermore, it is possible to prevent a possibility that the preheating cannot be normally performed since the pipeline is blocked due to condensed water.

According to a ninth aspect of this invention, the temperature sensor according to the eighth aspect may be disposed between the superheater and an evaporator. According to this configuration, the condensation can be reliably prevented in a pipeline in which the gas-phase steam flows, which is located downstream of the evaporator inside the gas turbine exhaust heat recovery device which is in a non-operation state, when viewed from the steam.

According to a tenth aspect of this invention the gas turbine exhaust heat recovery device according to the eighth or ninth aspect may include at least one of a valve for adjusting a steam flow rate and a desuperheater. The control device may operate at least one of the valve and the desuperheater, based on the steam temperature measured by the temperature sensor of the exhaust heat recovery boiler of the gas turbine exhaust heat recovery device which is in a non-operation state. According to this configuration, a degree of superheat of the steam can be reliably controlled inside the gas turbine exhaust heat recovery device which is in a non-operation state.

According to an eleventh aspect of this invention, the inter-device heat medium supply unit according to any one of the first to tenth aspects may include a mixing pipeline that is connected to an intermediate portion of a steam system of the plurality of gas turbine exhaust heat recovery devices, and that mixes the steam of the plurality of gas turbine exhaust heat recovery devices with each other, and that redistributes the mixed steam to each of the gas turbine exhaust heat recovery devices. According to this configuration, even if an output of the gas turbine is suddenly changed or the gas turbine is rapidly started up, the temperature is gently changed in an upstream portion of the exhaust gas or the steam turbine which become high-temperature in the gas turbine exhaust heat recovery device. Therefore, the thermal stress can be reduced.

According to a twelfth aspect of this invention, the gas turbine exhaust heat recovery plant according to the eleventh aspect may further include a control device that controls the plurality of gas turbine exhaust heat recovery devices. The control device may increase a load of a plurality of the gas turbines at an interval so that each of the gas turbines has a different timing for a load increase. According to this configuration, the temperature of the steam flowing in the gas turbine exhaust heat recovery device is gently changed. Therefore, the thermal stress can be reduced.

According to a thirteenth aspect of this invention, the load increase according to the twelfth aspect may be starting up each of the gas turbines. The control device may start up the plurality of gas turbines at an interval. According to this configuration, the plurality of gas turbines have mutually different starting up timings. Therefore, when the plurality of gas turbines are started up, the temperature of the steam flowing in the gas turbine exhaust heat recovery device can be gently changed.

According to a fourteenth aspect of this invention, the gas turbine exhaust heat recovery plant according to any one of the first to thirteenth aspects may further include an auxiliary boiler having a heat source which is different from a heat source of exhaust gas of the gas turbine. The inter-device heat medium supply unit may supply the water heated by the auxiliary boiler or the steam generated by the auxiliary boiler, to the other gas turbine exhaust heat recovery device. According to this configuration, for example, even in a case where all of the gas turbines are in a non-operation state or even in a case where all of the gas turbines have a low load and the steam having a sufficiently high temperature cannot be obtained, the auxiliary boiler can preheat the gas turbine exhaust heat recovery device.

According to a fifteenth aspect of this invention, the gas turbine exhaust heat recovery plant according to the first aspect may further include a steam merging pipeline and a control device. The steam merging pipeline may introduce the steam to one or a plurality of the steam-utilizing facilities after merging the steam generated by the plurality of gas turbine exhaust heat recovery devices. The control device may control the plurality of gas turbine exhaust heat recovery devices. The control device may increase a load of a plurality of the gas turbines at an interval so that each of the plurality of gas turbines has a different timing for a load increase. According to this configuration, the thermal stress of the steam-utilizing facility can be reduced by suppressing sudden increase in the temperature of the steam introduced into the steam-utilizing facility.

According to a sixteenth aspect of this invention, the load increase according to the fifteenth aspect may be starting up each of the gas turbines. The control device may start up the plurality of gas turbines at an interval. According to this configuration, the plurality of gas turbines have mutually different starting up timings. Therefore, when the plurality of gas turbines are started up, the temperature of the steam introduced to the steam-utilizing facility can be gently changed.

According to a seventeenth aspect of this invention, the gas turbine exhaust heat recovery plant according to the first aspect may further include a steam merging pipeline that distributes and introduces the steam to a plurality of the steam-utilizing facilities after merging the steam generated by the plurality of gas turbine exhaust heat recovery devices. According to this configuration, even in a case where the plurality of steam-utilizing facilities are provided, the thermal stress of the steam-utilizing facilities can be reduced by suppressing a sudden increase in the temperature of the steam to be introduced.

According to the gas turbine exhaust heat recovery plant, the life consumption rate can be reduced by suppressing the thermal stress resulting from sudden output variations.

DETAILED DESCRIPTION OF THE INVENTION

First Embodiment

Figure 1:
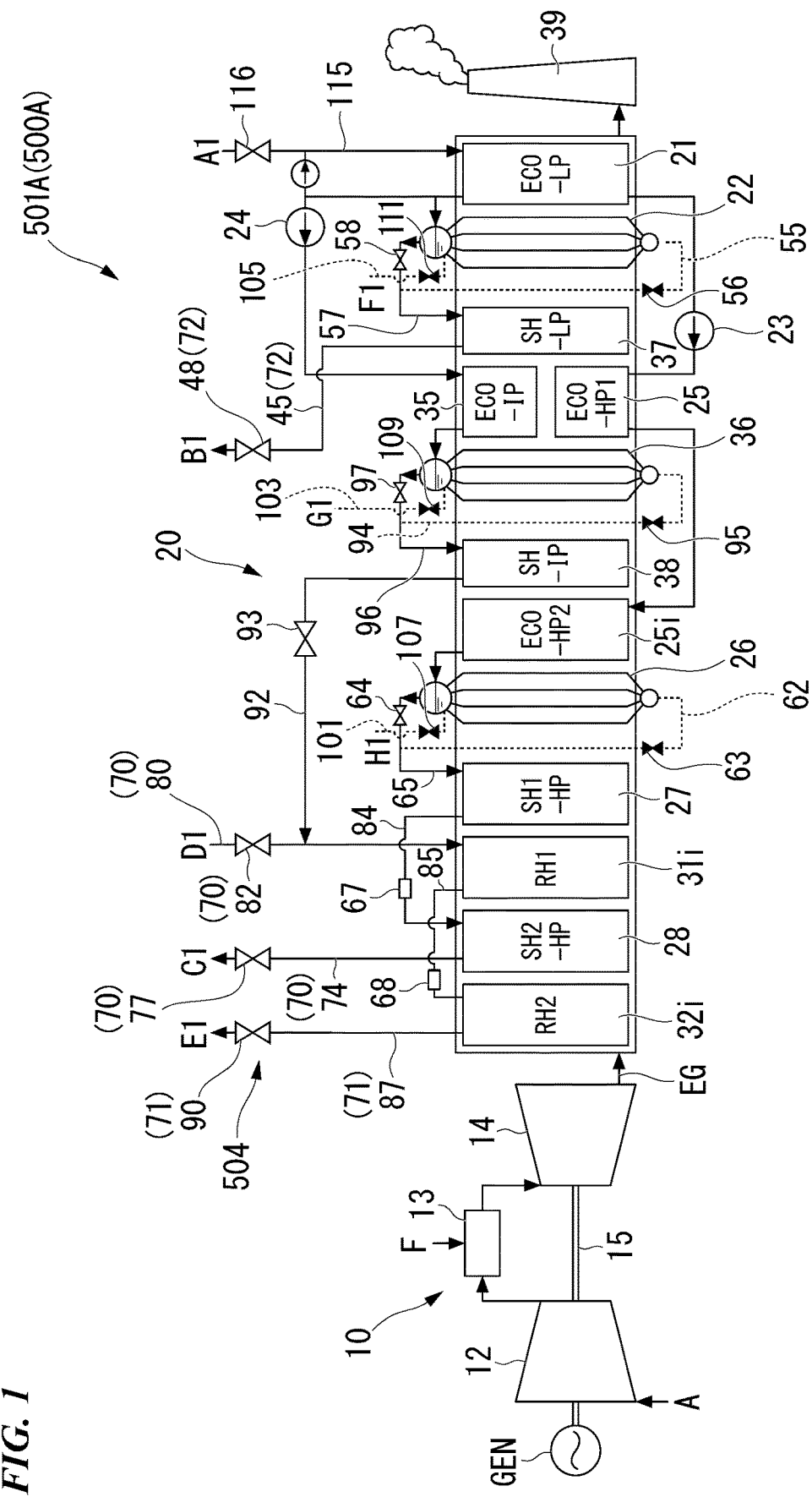
FIG. 1 is a view illustrating a schematic configuration of a first gas turbine exhaust heat recovery device according to a first embodiment of this invention.
Figure 2:
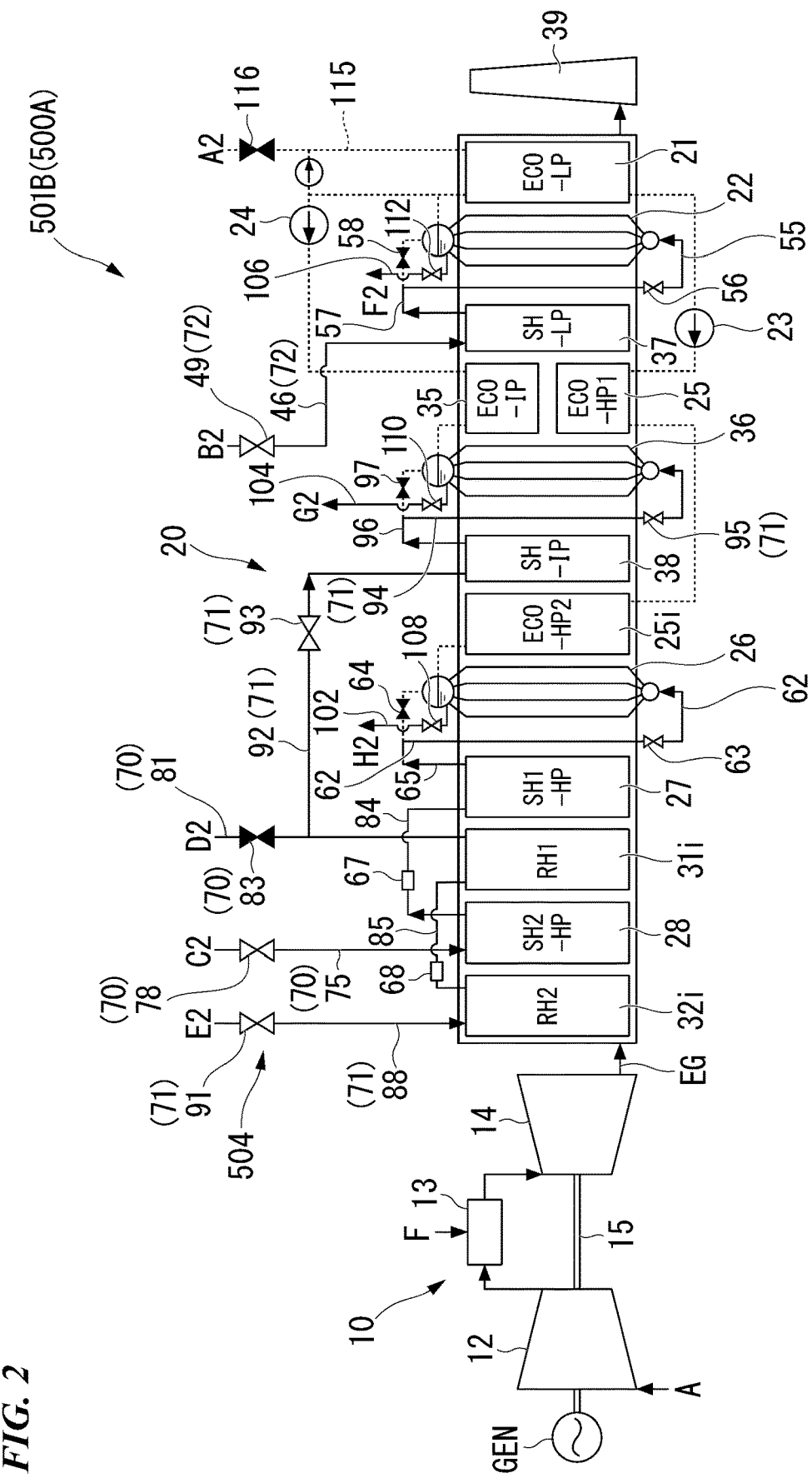
FIG. 2 is a view illustrating a schematic configuration of a second gas turbine exhaust heat recovery device according to the first embodiment of this invention.
Figure 3:
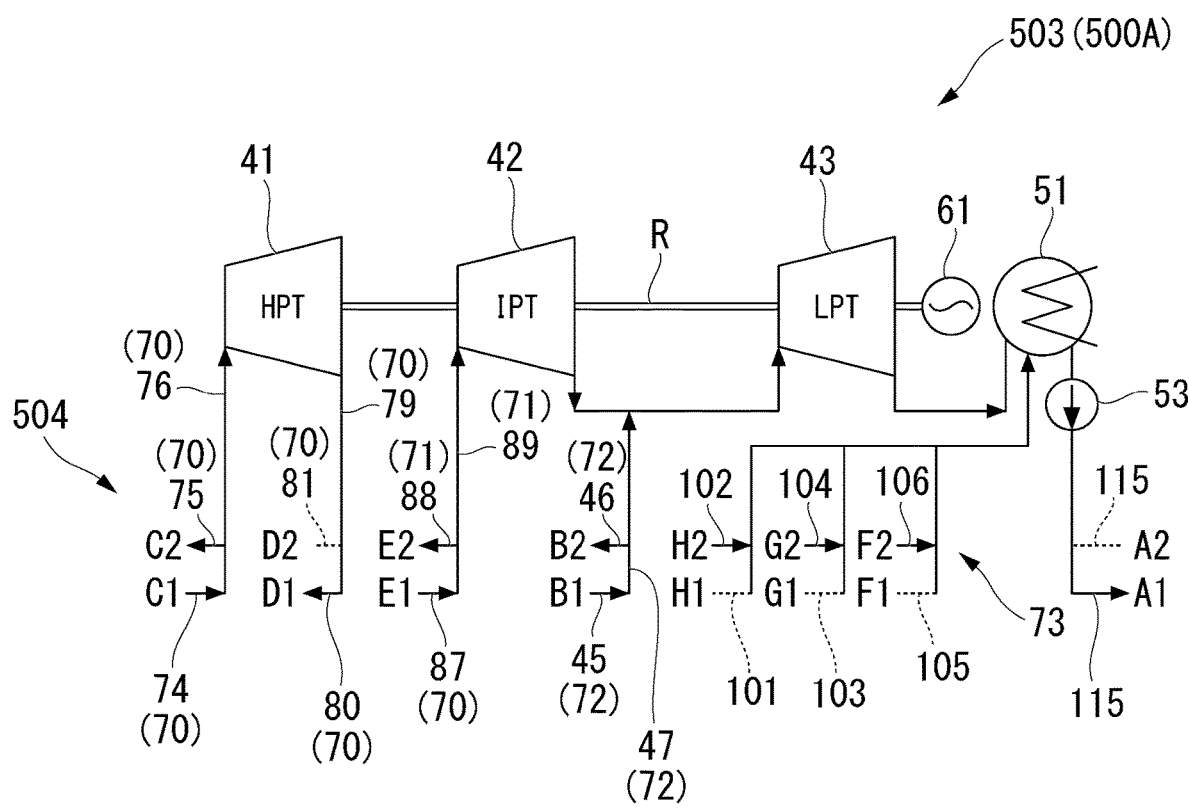
FIG. 3 is a view illustrating a schematic configuration of a steam-utilizing facility according to the first embodiment of this invention.

Next, a gas turbine exhaust heat recovery plant according to a first embodiment of this invention will be described with reference to the drawings. FIG. 1 is a view illustrating a schematic configuration of a first gas turbine exhaust heat recovery device according to the first embodiment of this invention. FIG. 2 is a view illustrating a schematic configuration of a second gas turbine exhaust heat recovery device according to the first embodiment of this invention. FIG. 3 is a view illustrating a schematic configuration of a steam-utilizing facility according to the first embodiment of this invention. In the drawings, a pipeline illustrated using a broken line indicates a pipeline in a state where steam and water are not circulated therein, and a pipeline illustrated using a solid line indicates a pipeline in a state where steam and water are circulated therein (hereinafter, the same applies to other embodiments). A white valve indicates an open state, and a black valve indicates a closed state.

As illustrated in FIGS. 1 to 3, a gas turbine exhaust heat recovery plant 500A is a "combined cycle plant" including a gas turbine and a steam turbine. The gas turbine exhaust heat recovery plant 500A recovers thermal energy from exhaust gas of a gas turbine so as to generate steam and drives a generator by utilizing the generated steam.

The gas turbine exhaust heat recovery plant 500A according to the first embodiment includes two gas turbine exhaust heat recovery devices (hereinafter, referred to as a first gas turbine exhaust heat recovery device 501A and a second gas turbine exhaust heat recovery device 501B), a steam-utilizing facility 503 (refer to FIG. 3), and an inter-device heat medium supply unit 504. In the following description, the first gas turbine exhaust heat recovery device 501A and the second gas turbine exhaust heat recovery device 501B may be simply referred to as a "gas turbine exhaust heat recovery device 501'" in a case where it is not necessary to distinguish these devices from each other.

As illustrated in FIG. 1, the first gas turbine exhaust heat recovery device 501A includes a gas turbine 10 and an exhaust heat recovery boiler 20. The second gas turbine exhaust heat recovery device 501B illustrated in FIG. 2 has basically the same configuration as the first gas turbine exhaust heat recovery device 501A and includes the gas turbine 10 and the exhaust heat recovery boiler 20. In the first embodiment, the first gas turbine exhaust heat recovery device 501A is in an operation state, and the second gas turbine exhaust heat recovery device 501B is in a non-operation state. In the following description, the same reference numerals will be given to configuration elements common to the first gas turbine exhaust heat recovery device 501A and the second gas turbine exhaust heat recovery device 501B, and only the first gas turbine exhaust heat recovery device 501A will be described in detail.

The gas turbine 10 includes an air compressor 12 that compresses air, a combustor 13 that generates fuel gas by combusting a fuel F in the air compressed by the air compressor 12, and a turbine 14 driven using high-temperature and high-pressure combustion gas. A turbine rotor of the turbine 14 and a compressor rotor of the air compressor 12 are connected to each other so as to form a gas turbine rotor 15. For example, a generator GEN is connected to the gas turbine rotor 15. Exhaust gas EG exhausted from the turbine 14 is supplied to the exhaust heat recovery boiler 20.

The exhaust heat recovery boiler 20 generates the steam by utilizing thermal energy of the exhaust gas EG exhausted from the gas turbine 10. The exhaust heat recovery boiler 20 has a low-pressure economizer (ECO-LP) 21, a low-pressure evaporator 22, a medium-pressure pump 24, a high-pressure pump 23, a first high-pressure economizer (ECO-HP1) 25, a medium-pressure economizer (ECO-IP) 35, a medium-pressure evaporator 36, a medium-pressure superheater (SH1-IP) 38, a low-pressure superheater (SH1-LP) 37, a second high-pressure economizer (ECO-HP2) 25$i$, a high-pressure evaporator 26, a first high-pressure superheater (SH1-HP) 27, a first reheater (RH1) 31$i$, a second high-pressure superheater (SH2-HP) 28, and a second reheater (RH2) 32$i$.

The low-pressure economizer (ECO-LP) 21 heats water supplied from a steam condenser (to be described later) of the steam-utilizing facility 503. The low-pressure evaporator 22 converts the water heated by the low-pressure economizer 21 into the steam. The low-pressure evaporator 22 as an example in this embodiment is a natural circulation boiler whose upper par has a tank (hereinafter, the same applies to the medium-pressure evaporator 36 and the high-pressure evaporator 26).

The medium-pressure pump 24 pressurizes the water heated by the low-pressure economizer 21 and supplies the water to the medium-pressure economizer 35. The medium-pressure economizer (ECO-IP) 35 heats the water pressurized by the medium-pressure pump 24. The medium-pressure evaporator 36 further heats the water heated by the medium-pressure economizer 35 and converts the water into the steam.

The high-pressure pump 23 pressurizes the water heated by the low-pressure economizer 21 and supplies the water to the first high-pressure economizer 25. The first high-pressure economizer (ECO-HP1) 25 heats the water pressurized by the high-pressure pump 23. The second high-pressure economizer (ECO-HP2) 25$i$ further heats high-pressure water heated by the first high-pressure economizer 25. The high-pressure evaporator 26 heats the high-pressure water heated by the second high-pressure economizer 25$i$ and converts the water into the steam. The first high-pressure superheater (SH1-HP) 27 superheats the steam generated by the high-pressure evaporator 26. The high-pressure evaporator 26 is a plurality of evaporators belonging to the exhaust heat recovery boiler 20, that is, the highest-pressure evaporator among the low-pressure evaporator 22, the medium-pressure evaporator 36, and the high-pressure evaporator 26. The second high-pressure superheater (SH2-HP) 28 further superheats the steam superheated by the first high-pressure superheater 27. The steam superheated by the second high-pressure superheater 28 is supplied to a high-pressure steam turbine 41 of the steam-utilizing facility 503. A pipeline 84 which connects the first high-pressure superheater 27 and the second high-pressure superheater 28 to each other has a first desuperheater 67 for lowering the temperature of the steam. The first desuperheater 67 lowers the steam temperature by using water spray so that a degree of superheat of the steam is constant.

The first reheater (RH1) 31$i$ superheats the steam discharged from the high-pressure steam turbine 41 of the steam-utilizing facility 503. The second reheater (RH2) 32$i$ further superheats the steam superheated by the first reheater 31$i$. The steam superheated by the second reheater 32$i$ is supplied to a medium-pressure steam turbine 42 of the steam-utilizing facility 503. A second desuperheater 68 is disposed in a pipeline 85 which connects the first reheater 31$i$ and the second reheater 32$i$ to each other. As in the first desuperheater 67, a degree of superheat of the steam is set to be constant by a second desuperheater 68.

Here, in a direction in which the exhaust gas EG flows in the exhaust heat recovery boiler 20, a side close to the gas turbine 10 will be referred to as an upstream side, and a side opposite thereto and close to a stack 39 will be referred to as a downstream side. Inside the exhaust heat recovery boiler 20, an arrangement is made from the downstream side to the upstream side, and the arrangement is in the order of the low-pressure economizer 21, the low-pressure evaporator 22, the low-pressure superheater 37, the first high-pressure economizer 25 (and the medium-pressure economizer 35), the medium-pressure evaporator 36, the medium-pressure superheater 38, the second high-pressure economizer 25*i*, the high-pressure evaporator 26, the first high-pressure superheater 27, the first reheater 31*i*, the second high-pressure superheater 28, the second reheater 32*i*. In the exhaust heat recovery boiler 20 according to the first embodiment, the position of the first high-pressure economizer 25 and the position of the medium-pressure economizer 35 are the same as each other in a flowing direction of the exhaust gas EG.

As illustrated in FIG. 3, the steam-utilizing facility 503 includes the high-pressure steam turbine 41, the medium-pressure steam turbine 42, a low-pressure steam turbine 43, a steam condenser 51, and a water supply pump 53. The high-pressure steam turbine 41, the medium-pressure steam turbine 42, and the low-pressure steam turbine 43 are respectively driven using the steam generated by the exhaust heat recovery boiler 20. A turbine rotor of the high-pressure steam turbine 41 of the steam-utilizing facility 503 as an example according to the first embodiment, a turbine rotor of the medium-pressure steam turbine 42, and a turbine rotor of the low-pressure steam turbine 43 are connected to each other so as to form one turbine rotor R. The turbine rotor is connected to a generator 61.

The high-pressure steam turbine 41 is driven using the steam superheated by the second high-pressure superheater 28 of the exhaust heat recovery boiler 20. The medium-pressure steam turbine 42 is driven using the steam superheated by the second reheater 32*i*. The low-pressure steam turbine 43 is driven using the steam superheated by the low-pressure superheater 37 and the steam discharged from the medium-pressure steam turbine 42.

The steam condenser 51 returns the steam discharged from the low-pressure steam turbine 43 to the water. The steam condenser 51 returns the steam utilized for preheating in the gas turbine exhaust heat recovery device 501 which is in a non-operation state (to be described later) to the water. The water supply pump 53 returns the water in the steam condenser 51 to the exhaust heat recovery boiler 20. Specifically, the water supply pump 53 returns the water in the steam condenser 51 to the low-pressure economizer 21.

As illustrated in FIGS. 1 to 3, the inter-device heat medium supply unit 504 is configured so that a portion of the steam generated by one of the first gas turbine exhaust heat recovery device 501A and the second gas turbine exhaust heat recovery device 501B can be supplied to the other. In the inter-device heat medium supply unit 504 according to the first embodiment, a portion of the steam generated by the first gas turbine exhaust heat recovery device 501A which is in an operation state can be supplied to the second gas turbine exhaust heat recovery device 501B which is in a non-operation state.

In the inter-device heat medium supply unit 504 as an example according to the first embodiment, a portion of the steam generated by the first gas turbine exhaust heat recovery device 501A can be supplied to the exhaust heat recovery boiler 20 of the second gas turbine exhaust heat recovery device 501B.

The inter-device heat medium supply unit 504 includes a first supply unit 70, a second supply unit 71, a third supply unit 72, and a condensate return unit 73. The first supply unit 70 can supply the steam superheated by the second high-pressure superheater 28 of the first gas turbine exhaust heat recovery device 501A and the steam superheated by the second high-pressure superheater 28 of the second gas turbine exhaust heat recovery device 501B, to the high-pressure steam turbine 41 and can supply the steam between the second high-pressure superheater 28 of the first gas turbine exhaust heat recovery device 501A and the second high-pressure superheater 28 of the second gas turbine exhaust heat recovery device 501B.

The first supply unit 70 includes a first high-pressure pipeline 74, a second high-pressure pipeline 75, a high-pressure inlet pipeline 76, a valve 77, a valve 78, an outlet pipeline 79, a first return pipeline 80, a second return pipeline 81, a valve 82, a valve 83, a diverging pipeline 62, a valve 63, and a valve 64.

The first high-pressure pipeline 74 connects the second high-pressure superheater 28 of the first gas turbine exhaust heat recovery device 501A and the high-pressure inlet pipeline 76 to each other. The second high-pressure pipeline 75 connects the second high-pressure superheater 28 of the second gas turbine exhaust heat recovery device 501B and the high-pressure inlet pipeline 76 to each other.

The high-pressure inlet pipeline 76 connects a steam inlet of the high-pressure steam turbine 41 to the first high-pressure pipeline 74 and the second high-pressure pipeline 75, respectively. The valve 77 is attached to the first high-pressure pipeline 74, and opens and closes an internal flow path of the first high-pressure pipeline 74. The valve 78 is attached to the second high-pressure pipeline 75 and opens and closes the internal flow path of the second high-pressure pipeline 75.

The outlet pipeline 79 connects a steam outlet of the high-pressure steam turbine 41 to the first return pipeline 80 and the second return pipeline 81. The first return pipeline 80 connects the outlet pipeline 79 and the first reheater 31*i* of the first gas turbine exhaust heat recovery device 501A to each other. The second return pipeline 81 connects the outlet pipeline 79 and the first reheater 31*i* of the second gas turbine exhaust heat recovery device 501B to each other. The valve 82 is attached to the first return pipeline 80 and opens and closes the internal flow path of the first return pipeline 80. The valve 83 is attached to the second return pipeline 81 and opens and closes the internal flow path of the second return pipeline 81.

The diverging pipeline 62 diverges from the pipeline 65 which connects a drum of the high-pressure evaporator 26 and the first high-pressure superheater 27 to each other and is connected to a lower portion of the high-pressure evaporator 26. The valve 63 is attached to the diverging pipeline 62 and opens and closes the internal flow path of the diverging pipeline 62. The valve 64 is attached to the pipeline 65. In the pipeline 65, the valve 64 is located on a side closer to the high-pressure evaporator 26 than a position from which the pipeline 62 diverges.

According to the first embodiment, the valve 77 and the valve 78 are in open state. In this manner, the steam superheated by the second high-pressure superheater 28 of the first gas turbine exhaust heat recovery device 501A which is in an operation state flows into the high-pressure inlet pipeline 76 via the first high-pressure pipeline 74. (refer to C1 in FIGS. 1 and 3). A portion of the steam flowing into the high-pressure inlet pipeline 76 diverges to the second high-pressure pipeline 75 (refer to C2 in FIG. 3). The remaining portion of the steam flowing into the high-pressure inlet pipeline 76 flows into the high-pressure steam turbine 41.

The steam diverging to the second high-pressure pipeline 75 flows into the second high-pressure superheater 28 of the second gas turbine exhaust heat recovery device 501B. Furthermore, the steam flows from the second high-pressure superheater 28 into the first high-pressure superheater 27 via the pipeline 84. In this manner, the second high-pressure superheater 28 and the first high-pressure superheater 27 of the second gas turbine exhaust heat recovery device 501B which is in a non-operation state are preheated by the steam.

According to the first embodiment, the valve 63 of the second gas turbine exhaust heat recovery device 501B is in an open state, and the valve 64 is in a closed state. In the first gas turbine exhaust heat recovery device 501A, the valve 63 is in a closed state, and the valve 64 is in an open state. In this manner, the steam is supplied from the first high-pressure superheater 27 of the second gas turbine exhaust heat recovery device 501B to a lower portion of the high-pressure evaporator 26 via the pipelines 65 and 62. Therefore, the high-pressure evaporator 26 which is in a non-operation state is preheated by the steam.

Furthermore, according to the first embodiment, the valve 82 is in an open state, and the valve 83 is in a closed state. The steam discharged from the high-pressure steam turbine 41 does not flow into the second return pipeline 81 and flows into the first return pipeline 80 (refer to D1 in FIGS. 1 and 3). The steam is superheated after flowing into the first reheater 31i of the first gas turbine exhaust heat recovery device 501A which is in an operation state. The steam superheated by the first reheater 31i is superheated again after flowing into the second reheater 32i via the pipeline 85.

The second supply unit 71 can supply the steam superheated by the second reheater 32i of the first gas turbine exhaust heat recovery device 501A and the steam superheated by the second reheater 32i of the second gas turbine exhaust heat recovery device 501B, to the medium-pressure steam turbine 42, and can supply the steam between the second reheater 32i of the first gas turbine exhaust heat recovery device 501A and the second reheater 32i of the second gas turbine exhaust heat recovery device 501B.

The second supply unit 71 includes a first medium-pressure pipeline 87, a second medium-pressure pipeline 88, a medium-pressure inlet pipeline 89, a valve 90, a valve 91, a pipeline 92, a valve 93, a pipeline 94, a valve 95, and a valve 97. The first medium-pressure pipeline 87 connects the second reheater 32i of the first gas turbine exhaust heat recovery device 501A and the medium-pressure inlet pipeline 89 to each other. The second medium-pressure pipeline 88 connects the second reheater 32i of the second gas turbine exhaust heat recovery device 501B and the medium-pressure inlet pipeline 89 to each other.

The medium-pressure inlet pipeline 89 connects the steam inlet of the medium-pressure steam turbine 42 to the first medium-pressure pipeline 87 and the second medium-pressure pipeline 88, respectively. The valve 90 is attached to the first medium-pressure pipeline 87 and opens and closes the internal flow path of the first medium-pressure pipeline 87. The valve 91 is attached to the second medium-pressure pipeline 88 and opens and closes the internal flow path of the second medium-pressure pipeline 88.

The pipeline 92 diverges from an intermediate portion of the second return pipeline 81 and is connected to the medium-pressure superheater 38. The valve 93 is attached to the pipeline 92, and opens and closes the internal flow path of the pipeline 92. The pipeline 94 diverges from the pipeline 96 which connects a drum of the medium-pressure evaporator 36 and the medium-pressure superheater 38 to each other and is connected to a lower portion of the medium-pressure evaporator 36. The valve 95 is attached to the pipeline 94 and opens and closes the internal flow path of the pipeline 94. The valve 97 is attached to the pipeline 96. In the pipeline 96, the valve 97 is located on a side closer to the medium-pressure evaporator 36 than a position from which the pipeline 94 diverges.

According to the first embodiment, the valve 90 and the valve 91 are in an open state. In this manner, the steam superheated by the second reheater 32i of the first gas turbine exhaust heat recovery device 501A which is in an operation state flows into the medium-pressure inlet pipeline 89 via the first medium-pressure pipeline 87 (refer to E1 in FIGS. 1 and 3). A portion of the steam flowing into the medium-pressure inlet pipeline 89 diverges to the second medium-pressure pipeline 88 (refer to E2 in FIG. 3). The remaining portion of the steam flowing into the medium-pressure inlet pipeline 89 flows into the medium-pressure steam turbine 42.

The steam diverging to the second medium-pressure pipeline 88 flows into the second reheater 32i of the second gas turbine exhaust heat recovery device 501B. Furthermore, the steam flows from the second reheater 32i into the first reheater 31i via the pipeline 85. Therefore, the second reheater 32i and the first reheater 31i of the second gas turbine exhaust heat recovery device 501B which is in a non-operation state are preheated.

Furthermore, according to the first embodiment, the valve 93 and the valve 95 of the second gas turbine exhaust heat recovery device 501B are in an open state, and the valve 97 is in a closed state. In the first gas turbine exhaust heat recovery device 501A, the valve 95 is a closed state, and the valve 97 is in an open state. In this manner, the steam is supplied from the first reheater 31i of the second gas turbine exhaust heat recovery device 501B to the medium-pressure superheater 38 via the pipeline 92. The steam is supplied from the medium-pressure superheater 38 to a lower portion of the medium-pressure evaporator 36 via the pipelines 96 and 94. Therefore, the medium-pressure superheater 38 and the medium-pressure evaporator 36 which is in a non-operation state are preheated by the steam.

On the other hand, the steam discharged from the medium-pressure steam turbine 42 is supplied to the low-pressure steam turbine 43, together with the steam superheated by the low-pressure superheater 37 of the first gas turbine exhaust heat recovery device 501A.

The third supply unit 72 can supply the steam superheated by the low-pressure superheater 37 of the first gas turbine exhaust heat recovery device 501A and the steam superheated by the low-pressure superheater 37 of the second gas turbine exhaust heat recovery device 501B, to the low-pressure steam turbine 43, and can supply the steam between the low-pressure superheater 37 of the first gas turbine exhaust heat recovery device 501A and the low-pressure superheater 37 of the second gas turbine exhaust heat recovery device 501B.

The third supply unit 72 includes a first low-pressure pipeline 45, a second low-pressure pipeline 46, a low-pressure inlet pipeline 47, a valve 48, a valve 49, a pipeline 55, a valve 56, and a valve 58. The first low-pressure pipeline 45 connects the low-pressure superheater 37 of the first gas turbine exhaust heat recovery device 501A and the low-pressure inlet pipeline 47 to each other. The second low-pressure pipeline 46 connects the low-pressure superheater 37 of the second gas turbine exhaust heat recovery device 501B and the low-pressure inlet pipeline 47 to each other. The valve 48 is attached to the first low-pressure pipeline 45 and opens and closes the internal flow path of the first low-pressure pipeline 45. The valve 49 is attached to the second low-pressure pipeline 46 and opens and closes the internal flow path of the second low-pressure pipeline 46.

The pipeline 55 diverges from the pipeline 57 which connects a drum of the low-pressure evaporator 22 and the low-pressure superheater 37 to each other and is connected to a lower portion of the low-pressure evaporator 22. The valve 56 is attached to the pipeline 55 and opens and closes the internal flow path of the pipeline 55. The valve 58 is attached to the pipeline 57 which connects a drum of the low-pressure evaporator 22 and the low-pressure superheater 37 to each other and opens and closes the internal flow path of the pipeline 57. In the pipeline 57, the valve 58 is located on a side closer to the low-pressure evaporator 22 than a position from which the pipeline 55 diverges.

According to the first embodiment, the valve 49 and the valve 50 are in an open state. Furthermore, according to the first embodiment, the valve 56 of the second gas turbine exhaust heat recovery device 501B is in an open state, and the valve 58 is in a closed state. The valve 56 of the first gas turbine exhaust heat recovery device 501A is in a closed state, and the valve 58 is in an open state. In this manner, the steam superheated by the low-pressure superheater 37 of the first gas turbine exhaust heat recovery device 501A which is in an operation state flows into the low-pressure inlet pipeline 47 via the first low-pressure pipeline 45 (refer to B1 in FIGS. 1 and 3). A portion of the steam flowing into the low-pressure inlet pipeline 47 diverges to the second low-pressure pipeline 46 (refer to B2 in FIG. 3). The remaining portion of the steam flowing into the low-pressure inlet pipeline 47 merges with the steam discharged from the medium-pressure steam turbine 42, and thereafter, flows into the low-pressure steam turbine 43.

The steam diverging to the second low-pressure pipeline 46 is supplied to the low-pressure superheater 37 of the second gas turbine exhaust heat recovery device 501B. Furthermore, the steam is supplied from the low-pressure superheater 37 to a lower portion of the low-pressure evaporator 22 via the pipelines 57 and 55. Therefore, the low-pressure superheater 37 and the low-pressure evaporator 22 which are in a non-operation state are preheated by the steam.

The condensate return unit 73 returns the steam utilized for preheating to the steam condenser 51. According to the first embodiment, the steam can be supplied to the steam condenser 51 from each drum of the high-pressure evaporator 26, the medium-pressure evaporator 36, and the low-pressure evaporator 22 of the second gas turbine exhaust heat recovery device 501B which is in a non-operation state. In order to cope with a case where the first gas turbine exhaust heat recovery device 501A is in a non-operation state and the second gas turbine exhaust heat recovery device 501B is in an operation state, the condensate return unit 73 can supply the steam to the steam condenser 51 from each drum of the high-pressure evaporator 26, the medium-pressure evaporator 36, and the low-pressure evaporator 22 of the first gas turbine exhaust heat recovery device 501A.

The condensate return unit 73 includes a first high-pressure return pipeline 101, a second high-pressure return pipeline 102, a first medium-pressure return pipeline 103, a second medium-pressure return pipeline 104, a first low-pressure return pipeline 105, a second low-pressure return pipeline 106, and valves 107 to 112.

The first high-pressure return pipeline 101 connects the drum of the high-pressure evaporator 26 of the first gas turbine exhaust heat recovery device 501A and the steam condenser 51 to each other. The valve 107 that opens and closes the internal flow path is attached to the first high-pressure return pipeline 101. The second high-pressure return pipeline 102 connects the drum of the high-pressure evaporator 26 of the second gas turbine exhaust heat recovery device 501B and the steam condenser 51 to each other. The valve 108 that opens and closes the internal flow path is attached to the second high-pressure return pipeline 102.

The first medium-pressure return pipeline 103 connects the drum of the medium-pressure evaporator 36 of the first gas turbine exhaust heat recovery device 501A and the steam condenser 51 to each other. The valve 109 that opens and closes the internal flow path is attached to the first medium-pressure return pipeline 103. The second medium-pressure return pipeline 104 connects the drum of the medium-pressure evaporator 36 of the second gas turbine exhaust heat recovery device 501B and the steam condenser 51 to each other. The valve 110 that opens and closes the internal flow path is attached to the second medium-pressure return pipeline 104.

The first low-pressure return pipeline 105 connects the drum of the low-pressure evaporator 22 of the first gas turbine exhaust heat recovery device 501A and the steam condenser 51 to each other. The valve 111 that opens and closes the internal flow path is attached to the first low-pressure return pipeline 105. The second low-pressure return pipeline 106 connects the drum of the low-pressure evaporator 22 of the second gas turbine exhaust heat recovery device 501B and the steam condenser 51 to each other. The valve 112 that opens and closes the internal flow path is attached to the second low-pressure return pipeline 106.

According to the first embodiment, the valves 107, 109, and 111 arranged between the first gas turbine exhaust heat recovery device 501A which is in an operation state and the steam condenser 51 are in a closed state, and the valves 108, 110, and 112 arranged between the second gas turbine exhaust heat recovery device 501B which is in a non-operation state and the steam condenser 51 are in an open state. According to this configuration, the condensate return unit 73 returns the steam utilized for preheating the second gas turbine exhaust heat recovery device 501B to the steam condenser 51.

The valve 116 is disposed in the pipeline 115 which connects the steam condenser 51 and the low-pressure economizer 21 to each other. The valve 116 of the first gas turbine exhaust heat recovery device 501A is in an open state, and the valve 116 of the second gas turbine exhaust heat recovery device 501B is in a closed state. In this manner, the water condensed by the steam condenser 51 is not supplied to the low-pressure economizer 21 of the stopped second gas turbine exhaust heat recovery device 501B (refer to A2 in FIG. 3) and is supplied only to the low-pressure economizer 21 (refer to A1 in FIG. 3) of the first gas turbine exhaust heat recovery device 501A which is in an operation state.

According to the first embodiment described above, a portion of the steam generated by the first gas turbine exhaust heat recovery device 501A can be utilized to preheat the second gas turbine exhaust heat recovery device 501B. Therefore, a temperature drop in the second gas turbine exhaust heat recovery device 501B is suppressed. Accordingly, a life consumption rate can be reduced by suppressing thermal consumption resulting from sudden output variations.

The exhaust heat recovery boiler 20 of the second gas turbine exhaust heat recovery device 501B can be preheated. Accordingly, thermal stress can be reduced in the exhaust heat recovery boiler 20. Furthermore, it is possible to suppress the temperature drop in the exhaust heat recovery boiler 20 of the second gas turbine exhaust heat recovery device 501B which is in a non-operation state. Accordingly, the thermal stress can be reduced even in a case where the second gas turbine exhaust heat recovery device 501B is started up to increase the output.

The steam evaporated by the high-pressure evaporator 26, the medium-pressure evaporator 36, and the low-pressure evaporator 22 of the exhaust heat recovery boiler 20 of the first gas turbine exhaust heat recovery device 501A which is in an operation state can be supplied to the high-pressure evaporator 26, the medium-pressure evaporator 36, and the low-pressure evaporator 22 of the exhaust heat recovery boiler 20 of the second gas turbine exhaust heat recovery device 501B which is in a non-operation state. In this manner, each evaporator of the second gas turbine exhaust heat recovery device 501B can be preheated. Therefore, in the second gas turbine exhaust heat recovery device 501B which is in a non-operation state, it is possible to reduce the thermal stress by effectively preheating the evaporator which needs a considerable heating time and a temperature difference from the exhaust gas is likely to increase since the evaporator has a large amount of can water and large heat capacity. The temperature of the can water can be raised in advance, and the steam can be generated in a short time when starting up the second gas turbine exhaust heat recovery device 501B which is in a non-operation state. In addition, it is possible to increase a steam generation amount in a short time.

The steam generated by the first gas turbine exhaust heat recovery device 501A which is in an operation state can be supplied to each evaporator of the exhaust heat recovery boiler 20 of the second gas turbine exhaust heat recovery device 501B which is in a non-operation state, via each superheater and each reheater of the exhaust heat recovery boiler 20 of the second gas turbine exhaust heat recovery device 501B which is in a non-operation state. Therefore, in the exhaust heat recovery boiler 20 of the second gas turbine exhaust heat recovery device 501B which is in a non-operation state, even when in a non-operation state, through preheating, it is possible to prevent condensation of the steam in each superheater and each reheater in which gas-phase steam flows when in an operation state. Therefore, it is possible to prevent a disadvantage that the pipeline may be blocked due to condensed water, or it is possible to prevent the thermal stress from occurring due to a temperature change caused by water condensation and re-evaporation. When in a non-operation state, the thermal stress can be effectively reduced by preheating the superheater and the reheater which are particularly high-temperature inside the exhaust heat recovery boiler when in an operation state and in which severe thermal stress is likely to occur when these are started up or when a load increases.

Out of the evaporators belonging to the first gas turbine exhaust heat recovery device 501A, the steam generated by the high-pressure evaporator 26 having the highest pressure is used. In this manner, the high-pressure evaporator 26 having the highest pressure can be preheated out of the evaporator s belonging to the second gas turbine exhaust heat recovery device 501B. Therefore, the steam is generated at the highest saturation temperature. Accordingly, the thermal stress of the high-pressure evaporator 26 exposed to the highest-temperature exhaust gas can be reduced by suppressing the temperature drop of the high-pressure evaporator 26 exposed to the highest-temperature exhaust gas. The preheating can be performed using the high-temperature and high-pressure steam. Accordingly, for example, the thermal stress can be effectively reduced when the gas turbine 10 is rapidly started up, and the output of the steam-utilizing facility 503 can be raised in a short time.

Furthermore, the first reheater 31$i$ and the second reheater 32$i$ of the second gas turbine exhaust heat recovery device 501B can be preheated using the high-temperature steam heated again by the first reheater 31$i$ and the second reheater 32$i$ of the first gas turbine exhaust heat recovery device 501A. Therefore, for example, the thermal stress can be effectively reduced when the gas turbine is rapidly started up, and the output of the steam turbine of the steam-utilizing facility 503 can be raised in a short time.

(First Modification Example of First Embodiment)

In the first embodiment described above, a case has been described where the first gas turbine exhaust heat recovery device 501A and the second gas turbine exhaust heat recovery device 501B are provided as the gas turbine exhaust heat recovery device 501. However, the number of the gas turbine exhaust heat recovery devices 501 is not limited to two. For example, the steam-utilizing facility 503 may be driven by the steam generated by three or more gas turbine exhaust heat recovery devices 501. In describing a first modification example of the first embodiment, the same reference numerals will be given to the same elements as those according to the first embodiment, and repeated description will be omitted.

Figure 4:
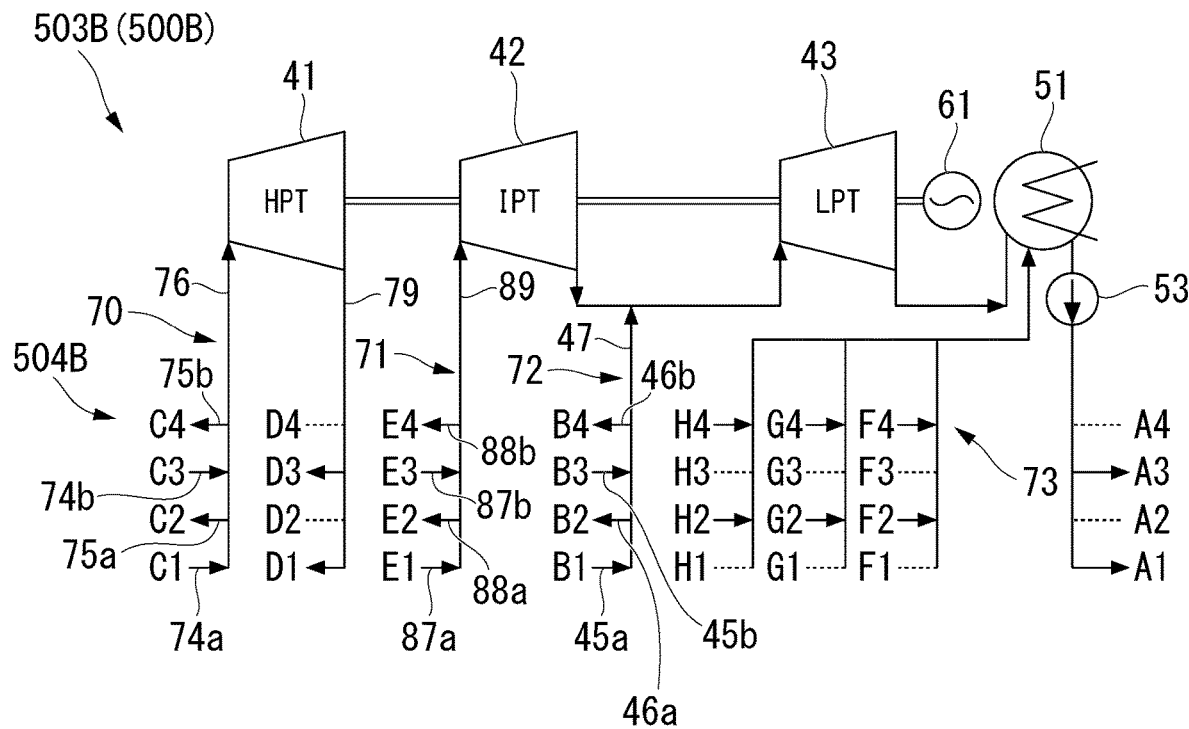
FIG. 4 is a view corresponding to FIG. 3 of a steam-utilizing facility and an inter-device heat medium supply unit according to a first modification example of the first embodiment of this invention.

FIG. 4 is a view corresponding to FIG. 3 of a steam-utilizing facility and an inter-device heat medium supply unit according to the first modification example of the first embodiment of this invention. As illustrated in FIG. 4, a gas turbine exhaust heat recovery plant 500B according to the first modification example of the first embodiment includes two gas turbine exhaust heat recovery devices 501 (not illustrated) in addition to the first gas turbine exhaust heat recovery device 501A and the second gas turbine exhaust heat recovery device 501B according to the first embodiment described above. The two gas turbine exhaust heat recovery devices 501 (hereinafter, referred to as a third gas turbine exhaust heat recovery device and a fourth gas turbine exhaust heat recovery device) have basically the same configuration as the first gas turbine exhaust heat recovery device 501A and the second gas turbine exhaust heat recovery device 501B. According to the first modification example of the first embodiment, the first gas turbine exhaust heat recovery device 501A and the third gas turbine exhaust heat recovery device are in an operation state. The second gas turbine exhaust heat recovery device 501B and the fourth gas turbine exhaust heat recovery device are in a non-operation state.

The inter-device heat medium supply unit 504B includes the first supply unit 70, the second supply unit 71, the third supply unit 72, and the condensate return unit 73. The first supply unit 70 can supply the steam superheated by each second high-pressure superheater 28 of the first gas turbine exhaust heat recovery device 501A to the fourth gas turbine exhaust heat recovery device, to the high-pressure steam turbine 41. The first supply unit 70 can further supply the steam between each second high-pressure superheater 28 of the first gas turbine exhaust heat recovery device 501A and the third gas turbine exhaust heat recovery device which are in an operation state and each second high-pressure superheater 28 of the second gas turbine exhaust heat recovery device 501B and the fourth gas turbine exhaust heat recovery device which are in a non-operation state.

According to the first supply unit 70 of the first modification example of the first embodiment, the steam superheated by each second high-pressure superheater 28 of the first gas turbine exhaust heat recovery device 501A and the third gas turbine exhaust heat recovery device which are in an operation state flows into the high-pressure inlet pipeline 76 via the first high-pressure pipelines 74a and 74b (refer to C1 and C3 in FIG. 4). A portion of the steam flowing into the high-pressure inlet pipeline 76 diverges to the second high-pressure pipelines 75a and 75b (refer to C2 and C4 in FIG. 4). The steam diverging to the second high-pressure pipelines 75a and 75b is supplied to the second high-pressure superheater 28 of the second gas turbine exhaust heat recovery device 501B and the second high-pressure superheater 28 of the third gas turbine exhaust heat recovery device. The steam discharged from the high-pressure steam turbine 41 returns to the first reheater 31i of the first gas turbine exhaust heat recovery device 501A and the third gas turbine exhaust heat recovery device which are in an operation state (refer to D1 and D3 in FIG. 4).

The second supply unit 71 can supply the steam superheated by each second reheater 32i of the first gas turbine exhaust heat recovery device 501A to the fourth gas turbine exhaust heat recovery device, to the medium-pressure steam turbine 42 and can supply the steam between each second reheater 32i of the first gas turbine exhaust heat recovery device 501A and the third gas turbine exhaust heat recovery device and each second reheater 32i of the second gas turbine exhaust heat recovery device 501B and the fourth gas turbine exhaust heat recovery device.

According to the second supply unit 71 of the first modification example of the first embodiment, the steam superheated by each second reheater 32i of the first gas turbine exhaust heat recovery device 501A and the third gas turbine exhaust heat recovery device which are in an operation state flows into the medium-pressure inlet pipeline 89 via the first medium-pressure pipelines 87a and 87b (refer to E1 and E3 in FIG. 4). A portion of the steam flowing into the medium-pressure inlet pipeline 89 diverges to the second medium-pressure pipelines 88a and 88b (refer to E2 and E4 in FIG. 4). The steam diverging to the second medium-pressure pipelines 88a and 88b is supplied to each second reheater 32i of the second gas turbine exhaust heat recovery device 501B and the fourth gas turbine exhaust heat recovery device. The remaining portion of the steam flowing into the medium-pressure inlet pipeline 89 flows into the medium-pressure steam turbine 42.

The third supply unit 72 can supply the steam superheated by each low-pressure superheater 37 of the first gas turbine exhaust heat recovery device 501A to the fourth gas turbine exhaust heat recovery device, to the lower-pressure steam turbine 43 and can supply the steam between each low-pressure superheater 37 of the first gas turbine exhaust heat recovery device 501A and the third gas turbine exhaust heat recovery device and each low-pressure superheater 37 of the second gas turbine exhaust heat recovery device 501B and the fourth gas turbine exhaust heat recovery device.

According to the third supply unit 72 of the first modification example of the first embodiment, the steam superheated by each low-pressure superheater 37 of the first gas turbine exhaust heat recovery device 501A and the third gas turbine exhaust heat recovery device which are in an operation state flows into the low-pressure inlet pipeline 47 via the first low-pressure pipelines 45a and 45b (refer to B1 and B3 in FIG. 4). A portion of the steam flowing into the low-pressure inlet pipeline 47 diverges to the second low-pressure pipelines 46a and 46b (refer to B2 and B4 in FIG. 4). The remaining portion of the steam flowing into the low-pressure inlet pipeline 47 merges with the steam discharged from the medium-pressure steam turbine 42, and thereafter, flows into the low-pressure steam turbine 43.

The condensate return unit 73 returns the steam utilized for preheating to the steam condenser 51. That is, according to the first modification example of the first embodiment, the steam is supplied to the steam condenser 51 from each drum of the high-pressure evaporator 26, the medium-pressure evaporator 36, and the low-pressure evaporator 22 of the second gas turbine exhaust heat recovery device 501B and the fourth gas turbine exhaust heat recovery device which are in a non-operation state (refer to H2, H4, G2, G4, F2, and F4 in FIG. 4). The water condensed by the steam condenser 51 is supplied to each low-pressure economizer 21 of the first gas turbine exhaust heat recovery device 501A and the third gas turbine exhaust heat recovery device which are in an operation state.

(Second Modification Example of First Embodiment)

Figure 5:
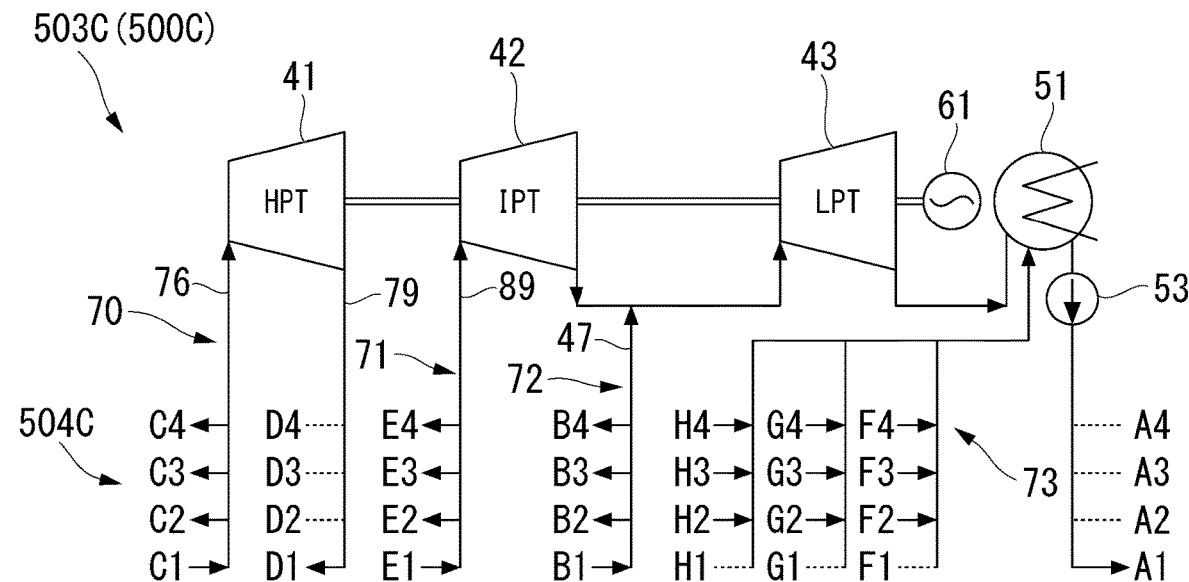
FIG. 5 is a view corresponding to FIG. 3 of a steam-utilizing facility and an inter-device heat medium supply unit according to a second modification example of the first embodiment of this invention.

FIG. 5 is a view corresponding to FIG. 3 of a steam-utilizing facility and an inter-device heat medium supply unit according to a second modification example of the first embodiment of this invention. In the first modification example of the first embodiment, a case has been described where the two gas turbine exhaust heat recovery devices 501 are in an operation state and the two gas turbine exhaust heat recovery devices 501 are in a non-operation state. However, as in a gas turbine exhaust heat recovery plant 500C according to the second modification example illustrated in FIG. 5, at least one of the plurality of gas turbine exhaust heat recovery devices 501 may be in an operation state. In this manner, the steam for preheating can be supplied from the gas turbine exhaust heat recovery device which is in an operation state 501 to the other gas turbine exhaust heat recovery device 501. Although not illustrated, in the plurality of gas turbine exhaust heat recovery devices 501, the number of the gas turbine exhaust heat recovery devices 501 which are in an operation state may be more than the number of the gas turbine exhaust heat recovery devices 501 which are in a non-operation state. The gas turbine exhaust heat recovery device 501 which is in an operation state described as an example in the first embodiment and each modification example may be brought into a non-operation state, and the gas turbine exhaust heat recovery device 501 which is in a non-operation state may be brought into an operation state. In a case where all of the gas turbine exhaust heat recovery devices 501 are in an operation state, the steam is supplied from all of the exhaust heat recovery boilers 20 to the steam-utilizing facility 503.

Second Embodiment

Next, a gas turbine exhaust heat recovery plant according to a second embodiment of this invention will be described with reference to the drawings. The gas turbine exhaust heat recovery plant according to the second embodiment is different from the gas turbine exhaust heat recovery plant according to the first embodiment described above in that every steam-utilizing facility is provided for the plurality of gas turbine exhaust heat recovery devices. Therefore, the same reference numerals will be given to the same elements as those according to the first embodiment described above, and repeated description will be omitted.

Figure 6:
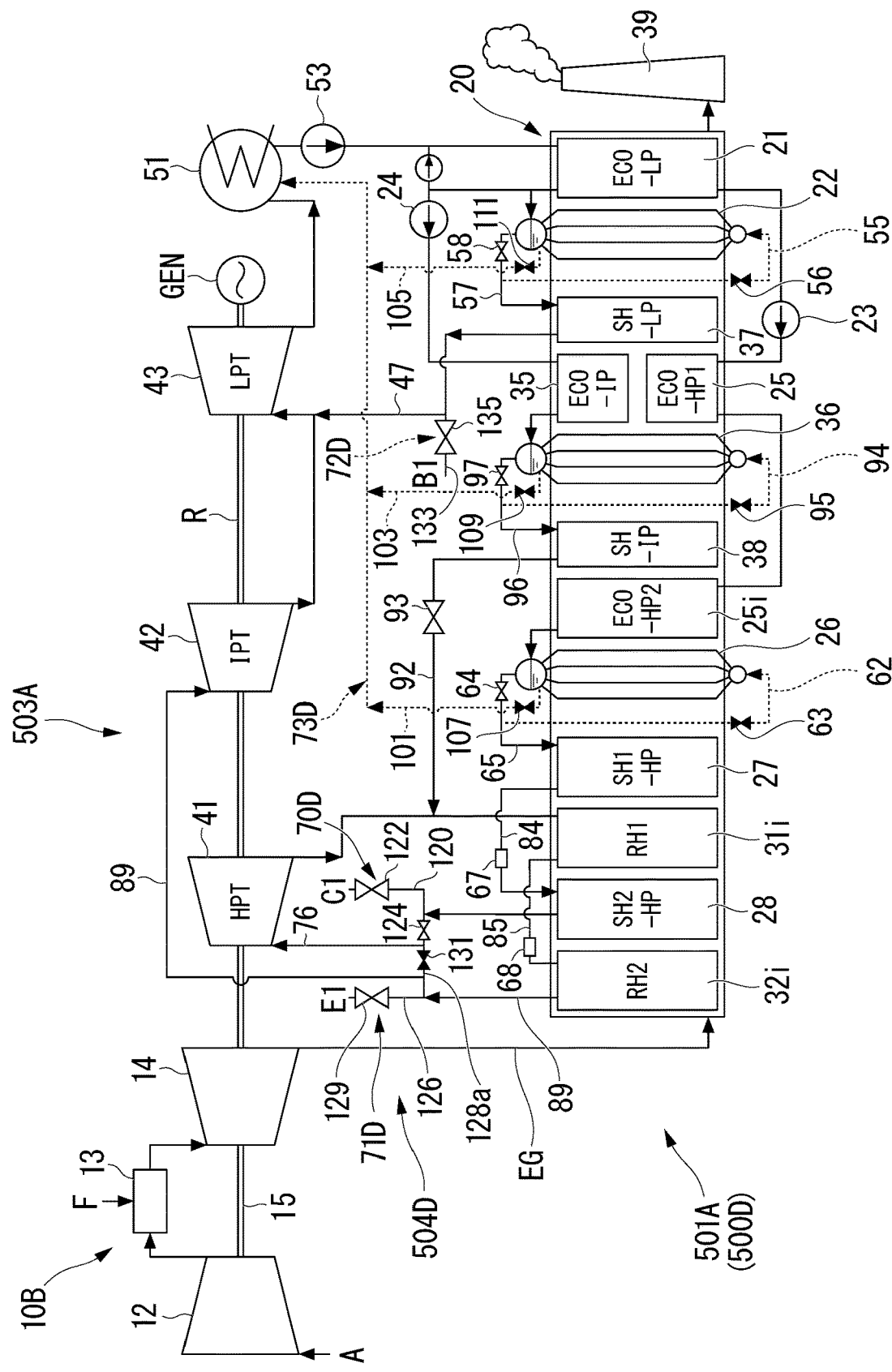
FIG. 6 is a view illustrating a schematic configuration of a first gas turbine exhaust heat recovery device according to a second embodiment of this invention.
Figure 7:
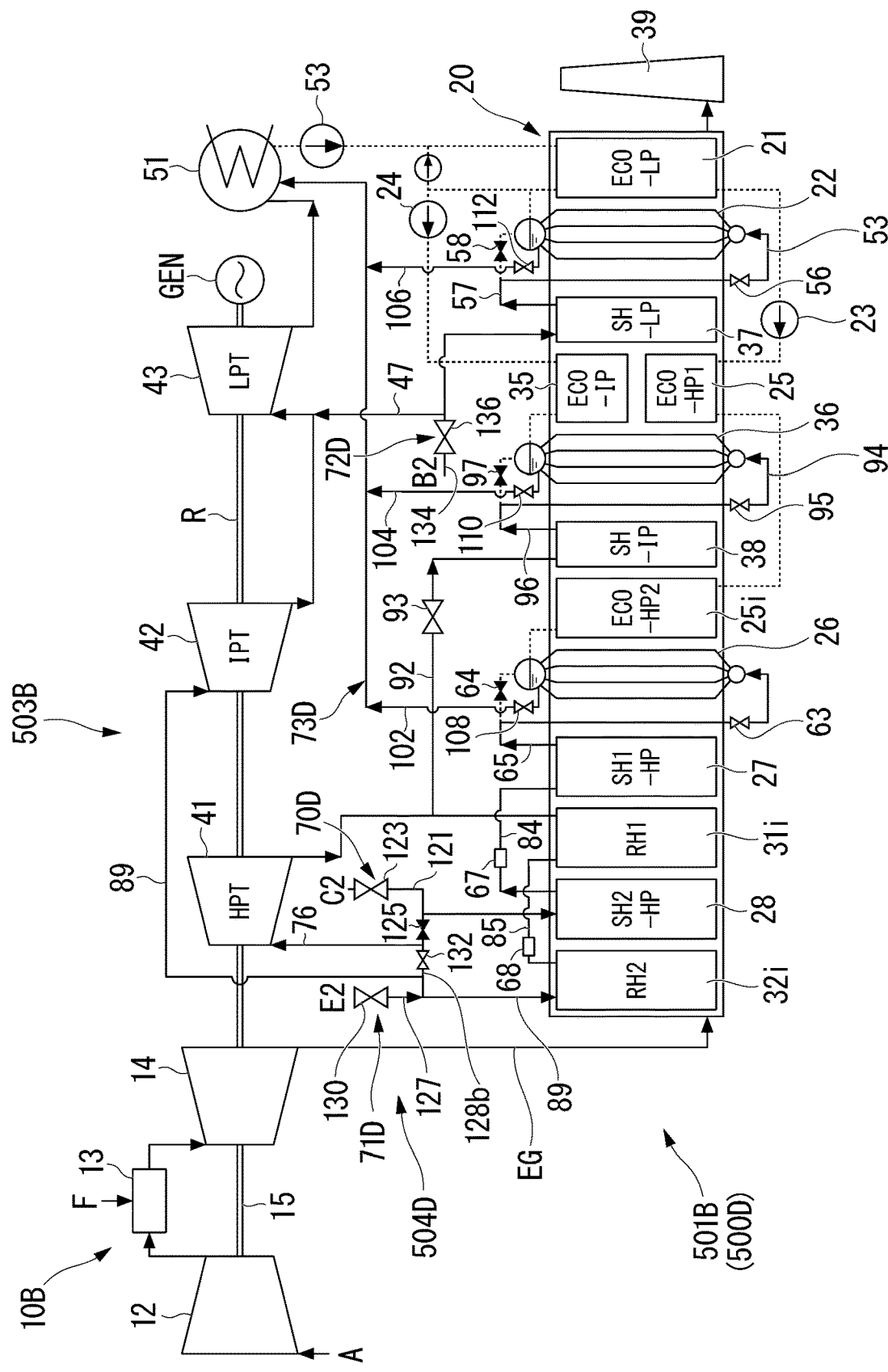
FIG. 7 is a view illustrating a schematic configuration of a second gas turbine exhaust heat recovery device according to the second embodiment of this invention.

FIG. 6 is a view illustrating a schematic configuration of a first gas turbine exhaust heat recovery device according to the second embodiment of this invention. FIG. 7 is a view illustrating a schematic configuration of a second gas turbine exhaust heat recovery device according to the second embodiment of this invention. As illustrated in FIGS. 6 and 7, a gas turbine exhaust heat recovery plant 500D according to the second embodiment includes two gas turbine exhaust heat recovery device 501 (first gas turbine exhaust heat recovery device 501A and second gas turbine exhaust heat recovery device 501B), two steam-utilizing facilities 503A and 503B, and an inter-device heat medium supply unit 504D.

The first gas turbine exhaust heat recovery device 501A includes a gas turbine 10B and the exhaust heat recovery boiler 20. The second gas turbine exhaust heat recovery device 501B has basically the same configuration as the first gas turbine exhaust heat recovery device 501A and includes the gas turbine 10B and the exhaust heat recovery boiler 20. The gas turbine 10B of the first gas turbine exhaust heat recovery device 501A is different from the gas turbine 10 according to the first embodiment, and the gas turbine rotor 15 is connected to the turbine rotor R of the steam-utilizing facility 503A. Similarly, the gas turbine rotor 15 of the second gas turbine exhaust heat recovery device 501B is connected to the turbine rotor R of the steam-utilizing facility 503B. The generator GEN is connected to the turbine rotor R.

As in the first embodiment, the exhaust heat recovery boiler 20 has the low-pressure economizer (ECO-LP) 21, the low-pressure evaporator 22, the medium-pressure pump 24, the high-pressure pump 23, the first high-pressure economizer (ECO-HP1) 25, the medium-pressure economizer (ECO-IP) 35, the medium-pressure evaporator 36, the medium-pressure superheater (SH1-IP) 38, the low-pressure superheater (SH1-LP) 37, the second high-pressure economizer (ECO-HP2) 25$i$, the high-pressure evaporator 26, the first high-pressure superheater (SH1-HP) 27, the first reheater (RH1) 31$i$, the second high-pressure superheater (SH2-HP) 28, and the second reheater (RH2) 32$i$. From the downstream side toward the upstream side in the flowing direction of the exhaust gas EG, the low-pressure economizer 21, the low-pressure evaporator 22, the low-pressure superheater 37, the first high-pressure economizer 25 (and the medium-pressure economizer 35), the medium-pressure evaporator 36, the medium-pressure superheater 38, the second high-pressure economizer 25$i$, the high-pressure evaporator 26, the first high-pressure superheater 27, the first reheater 31$i$, the second high-pressure superheater 28, and the second reheater 32$i$ are arranged in this order.

The steam-utilizing facility 503A is driven using the steam generated by the first gas turbine exhaust heat recovery device 501A. The steam-utilizing facility 503B is driven using the steam generated by the second gas turbine exhaust heat recovery device 501B. The steam-utilizing facilities 503A and 503B have the same configuration as the steam-utilizing facility 503 according to the first embodiment except that every steam-utilizing facility is disposed in each of the first gas turbine exhaust heat recovery device 501A and the second gas turbine exhaust heat recovery device 501B and that the steam-utilizing facility is connected to the gas turbine rotor 15. The steam-utilizing facilities 503A and 503B respectively include the high-pressure steam turbine 41, the medium-pressure steam turbine 42, the low-pressure steam turbine 43, the steam condenser 51, and the water supply pump 53.

The inter-device heat medium supply unit 504D is configured so that a portion of the steam superheated by one of the first gas turbine exhaust heat recovery device 501A and the second gas turbine exhaust heat recovery device 501B can be supplied to the other. The inter-device heat medium supply unit 504 according to the first embodiment can supply a portion of the steam superheated by the first gas turbine exhaust heat recovery device 501A which is in an operation state, to the exhaust heat recovery boiler 20 of the second gas turbine exhaust heat recovery device 501B which is in a non-operation state. The inter-device heat medium supply unit 504D can also supply a portion of the steam superheated by the first gas turbine exhaust heat recovery device 501A, to the steam-utilizing facility 503B which is in a non-operation state.

The inter-device heat medium supply unit 504D includes a first supply unit 70D, a second supply unit 71D, a third supply unit 72D, and a condensate return unit 73D. The first supply unit 70D can supply the steam superheated by the second high-pressure superheater 28 of the first gas turbine exhaust heat recovery device 501A, to the high-pressure steam turbine 41 of the steam-utilizing facility 503A, and can supply the steam superheated by the second high-pressure superheater 28 of the second gas turbine exhaust heat recovery device 501B, to the high-pressure steam turbine 41 of the steam-utilizing facility 503B. The inter-device heat medium supply unit 504D can supply the steam between the second high-pressure superheater 28 of the first gas turbine exhaust heat recovery device 501A and the second high-pressure superheater 28 of the second gas turbine exhaust heat recovery device 501B.

The first supply unit 70D includes pipelines 120 and 121, and valves 122, 123, 124, and 125. The pipeline 120 diverges from the high-pressure inlet pipeline 76 which connects the second high-pressure superheater 28 of the first gas turbine exhaust heat recovery device 501A and a steam inlet of the high-pressure steam turbine 41 of the steam-utilizing facility 503A to each other. The valve 122 that opens and closes the internal flow path of the pipeline 120 is attached to the pipeline 120.

The pipeline 121 diverges from the high-pressure inlet pipeline 76 which connects the second high-pressure superheater 28 of the second gas turbine exhaust heat recovery device 501B and a steam inlet of the high-pressure steam turbine 41 of the steam-utilizing facility 503B to each other. The valve 123 that opens and closes the internal flow path of the pipeline 121 is attached to the pipeline 121. An end portion (C1 in FIG. 6) of the pipeline 120 and an end portion (C2 in FIG. 7) of the pipeline 121 are connected to each other (C1-C2).

The valve 124 is attached to the high-pressure inlet pipeline 76 which connects the second high-pressure superheater 28 of the first gas turbine exhaust heat recovery device 501A and a steam inlet of the high-pressure steam turbine 41 of the steam-utilizing facility 503A to each other. Specifically, the valve 124 is attached to a side closer to the high-pressure steam turbine 41 than a position from which the pipeline 120 diverges in the high-pressure inlet pipeline 76. The valve 124 opens and closes the internal flow path of the high-pressure inlet pipeline 76.

The valve 125 is attached to the high-pressure inlet pipeline 76 which connects the second high-pressure superheater 28 of the second gas turbine exhaust heat recovery device 501B and a steam inlet of the high-pressure steam turbine 41 of the steam-utilizing facility 503B to each other. Specifically, the valve 125 is attached to a side closer to the high-pressure steam turbine 41 than the position from which the pipeline 120 diverges in the high-pressure inlet pipeline 76. The valve 125 opens and closes the internal flow path of the high-pressure inlet pipeline 76.

In the first supply unit 70D according to the second embodiment, the valves 122, 123, and 124 are in an open state, and the valve 125 is in a closed state. In this manner, the steam superheated by the second high-pressure superheater 28 of the first gas turbine exhaust heat recovery device 501A which is in an operation state flows into the high-pressure inlet pipeline 76. A portion of the steam flowing into the high-pressure inlet pipeline 76 diverges to the pipeline 120. The remaining portion of the steam flowing into the high-pressure inlet pipeline 76 flows into the high-pressure steam turbine 41. The steam diverging to the pipeline 120 flows into the pipeline 121, and flows into the second high-pressure superheater 28 of the second gas turbine exhaust heat recovery device 501B via the high-pressure inlet pipeline 76 of the second gas turbine exhaust heat recovery device 501B.

Furthermore, the steam flowing into the second high-pressure superheater 28 of the second gas turbine exhaust heat recovery device 501B flows into the first high-pressure superheater 27 of the second gas turbine exhaust heat recovery device 501B via the pipeline 84. Here, as in the first embodiment, the valve 63 of the second gas turbine exhaust heat recovery device 501B is in an open state, and the valve 64 is in a closed state. In this manner, the steam is supplied from the first high-pressure superheater 27 of the second gas turbine exhaust heat recovery device 501B to the lower portion of the high-pressure evaporator 26 via the pipelines 65 and 62. Therefore, the second high-pressure superheater 28, the first high-pressure superheater 27, and the high-pressure evaporator 26 of the second gas turbine exhaust heat recovery device 501B which is in a non-operation state are preheated by the steam. The steam utilized for preheating reaches the steam condenser 51 of the steam-utilizing facility 503B.

The second supply unit 71D includes pipelines 126 and 127, bypass pipelines 128a and 128b, and valves 129, 130, 131, and 132. The pipeline 126 diverges from the medium-pressure inlet pipeline 89 which connects the second reheater 32i of the first gas turbine exhaust heat recovery device 501A and a steam inlet of the medium-pressure steam turbine 42 of the steam-utilizing facility 503A to each other. The valve 129 that opens and closes the internal flow path of the pipeline 126 is attached to the pipeline 126.

The pipeline 127 diverges from the medium-pressure inlet pipeline 89 which connects the second reheater 32i of the second gas turbine exhaust heat recovery device 501B and a steam inlet of the medium-pressure steam turbine 42 of the steam-utilizing facility 503B to each other. The valve 130 that opens and closes the internal flow path of the pipeline 127 is attached to the pipeline 127. An end portion (E1 in FIG. 6) of the pipeline 126 and an end portion (E2 in FIG. 7) of the pipeline 127 are connected to each other (E1-E2).

The bypass pipeline 128a bypasses the medium-pressure inlet pipeline 89 and the high-pressure inlet pipeline 76 of the first gas turbine exhaust heat recovery device 501A. The valve 131 that opens and closes the internal flow path of the bypass pipeline 128a is attached to the bypass pipeline 128a. The bypass pipeline 128b bypasses the medium-pressure inlet pipeline 89 and the high-pressure inlet pipeline 76 of the second gas turbine exhaust heat recovery device 501B. The valve 132 that opens and closes the internal flow path of the bypass pipeline 128b is attached to the bypass pipeline 128b.

According to the second embodiment, the valves 129, 130, and 132 are in an open state, and the valve 131 is in a closed state. In this manner, the steam superheated by the second reheater 32i of the first gas turbine exhaust heat recovery device 501A which is in an operation state diverges from the medium-pressure inlet pipeline 89 to the pipeline 126 and flows into the pipeline 127 (E1 in FIG. 6 to E2 in FIG. 7). That is, a portion of the steam flowing into the medium-pressure inlet pipeline 89 of the first gas turbine exhaust heat recovery device 501A diverges to the pipeline 126, and the remaining portion of the steam flowing into the medium-pressure inlet pipeline 89 flows into the medium-pressure steam turbine 42.

The steam flowing into the pipeline 127 flows into the medium-pressure inlet pipeline 89 of the second gas turbine exhaust heat recovery device 501B. The steam flowing into the medium-pressure inlet pipeline 89 is divided and flows into the second reheater 32i of the second gas turbine exhaust heat recovery device 501B and the medium-pressure steam turbine 42 of the steam-utilizing facility 503B. The steam flowing into the second reheater 32i of the second gas turbine exhaust heat recovery device 501B flows into the first reheater 31i. Therefore, the second reheater 32i and the first reheater 31i of the second gas turbine exhaust heat recovery device 501B which is in a non-operation state are preheated by the steam.

As in the first embodiment, the valve 93 and the valve 95 of the second gas turbine exhaust heat recovery device 501B are in an open state, and the valve 97 is in a closed state. In this manner, the steam is supplied from the first reheater 31i of the second gas turbine exhaust heat recovery device 501B to the medium-pressure superheater 38 via the pipeline 92. Furthermore, the steam is supplied from the medium-pressure superheater 38 of the second gas turbine exhaust heat recovery device 501B to the lower portion of the medium-pressure evaporator 36 via the pipelines 96 and 94. Therefore, the medium-pressure superheater 38 and the medium-pressure evaporator 36 which are in a non-operation state are preheated by the steam. The steam discharged from the medium-pressure evaporator 36 reaches the steam condenser 51 via the condensate return unit 73D.

The valve 131 of the first gas turbine exhaust heat recovery device 501A is in a closed state, and the valve 132 of the second gas turbine exhaust heat recovery device 501B is in an open state. In this manner, the steam flowing into the medium-pressure inlet pipeline 89 via the pipeline 127 flows into the high-pressure inlet pipeline 76 via the bypass pipeline 128b and reaches the high-pressure steam turbine 41. Therefore, the high-pressure steam turbine 41 which is in a non-operation state is preheated by the steam. The steam discharged from the high-pressure steam turbine 41 merges with the steam discharged from the first reheater 31i and flows into the pipeline 92.

On the other hand, the steam discharged from the medium-pressure steam turbine 42 of the steam-utilizing facility 503B flows into the low-pressure steam turbine 43 and thereafter, reaches the steam condenser 51. The medium-pressure steam turbine 42 and the low-pressure steam turbine 43 of the second gas turbine exhaust heat recovery device 501B are not driven by the steam flowing from the first gas turbine exhaust heat recovery device 501A. The medium-pressure steam turbine 42 and the low-pressure steam turbine 43 which are in a non-operation state are only preheated by the steam.

The third supply unit 72D can supply the steam superheated by the low-pressure superheater 37 of the first gas turbine exhaust heat recovery device 501A, to the low-pressure steam turbine 43 of the steam-utilizing facility 503A and can supply the steam superheated by the low-pressure superheater 37 of the second gas turbine exhaust heat recovery device 501B, to the low-pressure steam turbine 43 of the steam-utilizing facility 503B. The third supply unit 72D can supply the steam between the low-pressure superheater 37 of the first gas turbine exhaust heat recovery device 501A and the low-pressure superheater 37 of the second gas turbine exhaust heat recovery device 501B.

The third supply unit 72D includes pipelines 133 and 134, and valves 135 and 136. The pipeline 133 diverges from the low-pressure inlet pipeline 47 which connects the low-pressure superheater 37 of the first gas turbine exhaust heat recovery device 501A and the low-pressure steam turbine 43 of the steam-utilizing facility 503A to each other. The valve 135 that opens and closes the internal flow path of the pipeline 133 is attached to an intermediate portion of the pipeline 133.

The pipeline 134 diverges from the low-pressure inlet pipeline 47 which connects the low-pressure superheater 37 of the second gas turbine exhaust heat recovery device 501B and the low-pressure steam turbine 43 of the steam-utilizing facility 503B to each other. The valve 136 that opens and closes the internal flow path of the pipeline 134 is attached to an intermediate portion of the pipeline 134. An end portion (B1 in FIG. 6) of the pipeline 133 and an end portion (B2 in FIG. 7) of the pipeline 134 are connected to each other (B1-B2).

According to the second embodiment, the valves 135 and 136 are in an open state. In this manner, a portion of the steam superheated by the low-pressure superheater 37 of the first gas turbine exhaust heat recovery device 501A which is in an operation state diverges to the pipeline 133 via the low-pressure inlet pipeline 47. The remaining portion of the steam flowing into the low-pressure inlet pipeline 47 flows into the low-pressure steam turbine 43. The steam diverging to the pipeline 133 and flowing into the pipeline 134 flows into the low-pressure inlet pipeline 47 of the second gas turbine exhaust heat recovery device 501B. A portion of the steam flowing into the low-pressure inlet pipeline 47 of the second gas turbine exhaust heat recovery device 501B flows into the low-pressure superheater 37 of the second gas turbine exhaust heat recovery device 501B. On the other hand, the remaining portion of the steam flowing into the low-pressure inlet pipeline 47 of the second gas turbine exhaust heat recovery device 501B via the pipeline 134 flows into the low-pressure steam turbine 43 of the steam-utilizing facility 503B. Therefore, the low-pressure steam turbine 43 which is in a non-operation state is preheated by the steam. The steam discharged from the low-pressure steam turbine 43 reaches the steam condenser 51.

The condensate return unit 73D returns the steam utilized for preheating to the steam condenser 51. According to the second embodiment, the steam can be supplied to the steam condenser 51 from each drum of the high-pressure evaporator 26, the medium-pressure evaporator 36, and the low-pressure evaporator 22 of the second gas turbine exhaust heat recovery device 501B which is in a non-operation state. As in the first embodiment, in order to cope with a case where the first gas turbine exhaust heat recovery device 501A is in a non-operation state and the second gas turbine exhaust heat recovery device 501B is in an operation state, as in the second gas turbine exhaust heat recovery device 501B, the condensate return unit 73 can supply the steam to the steam condenser 51 from each drum of the high-pressure evaporator 26, the medium-pressure evaporator 36, and the low-pressure evaporator 22 of the first gas turbine exhaust heat recovery device 501A.

As in the condensate return unit 73 according to the first embodiment, the condensate return unit 73D includes the first high-pressure return pipeline 101, the second high-pressure return pipeline 102, the first medium-pressure return pipeline 103, the second medium-pressure return pipeline 104, the first low-pressure return pipeline 105, the second low-pressure return pipeline 106, and the valves 107 to 112. According to the second embodiment, the valves 108, 110, and 112 attached to the second high-pressure return pipeline 102, the second medium-pressure return pipeline 104, and the second low-pressure return pipeline 106 connected to the second gas turbine exhaust heat recovery device 501B which is in a non-operation state are in an open state. The valves 107, 109, and 111 attached to the first high-pressure return pipeline 101, the first medium-pressure return pipeline 103, and the first low-pressure return pipeline 105 connected to the first gas turbine exhaust heat recovery device 501A which is in an operation state are in a closed state. In this manner, the condensate return unit 73D returns the steam utilized for preheating the second gas turbine exhaust heat recovery device 501B, to the steam condenser 51.

Therefore, according to the second embodiment described above, in a case where the plurality of steam-utilizing facilities 503A and 503B are provided, the steam-utilizing facility 503B which is in a non-operation state can also be preheated by the steam in addition to the second gas turbine exhaust heat recovery device 501B which is in a non-operation state. Therefore, even in a case where the output suddenly varies such as when the steam-utilizing facility 503B which is in a non-operation state is started up, the life consumption rate of the steam-utilizing facility 503B can be reduced by suppressing the thermal stress.

(First Modification Example and Second Modification Example of Second Embodiment)

In the second embodiment described above, a case of providing two systems including the gas turbine, the gas turbine exhaust heat recovery device, and the steam-utilizing facility has been described as an example. However, the number of systems is not limited to two, and may be three or more.

Figure 8:
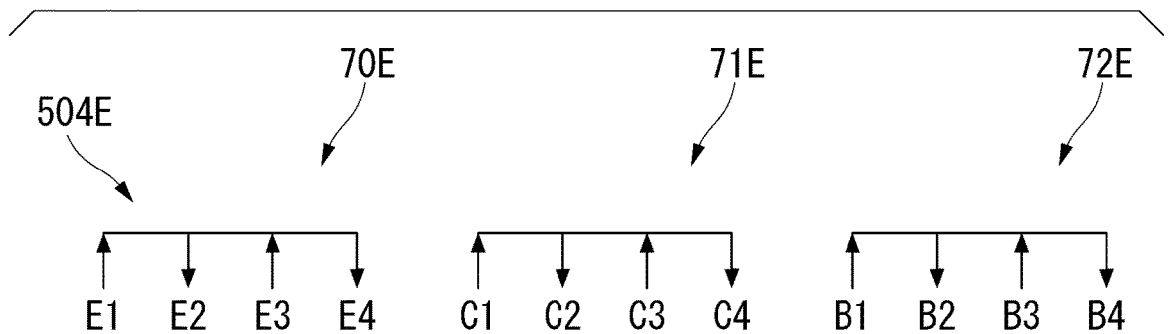
FIG. 8 is a view illustrating a steam flow of an inter-device heat medium supply unit according to a first modification example of the second embodiment of this invention.
Figure 9:
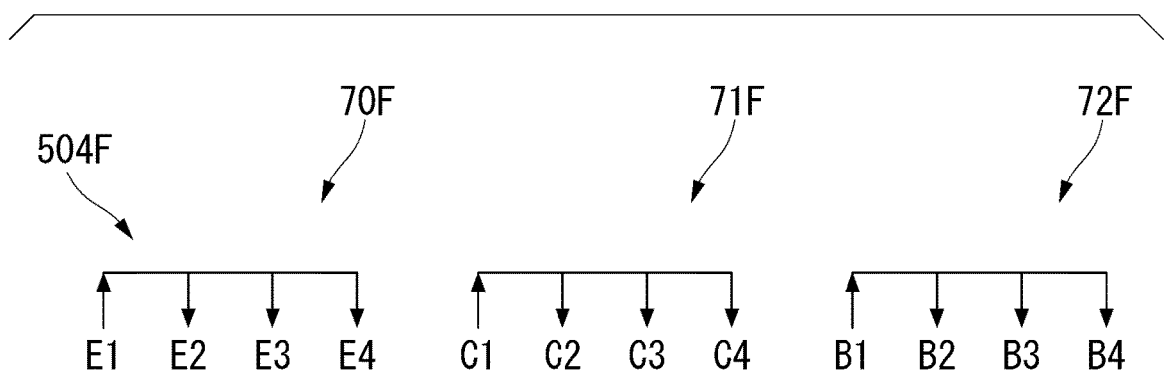
FIG. 9 is a view illustrating a steam flow of an inter-device heat medium supply unit according to a second modification example of the second embodiment of this invention.

FIG. 8 is a view illustrating a steam flow of an inter-device heat medium supply unit according to a first modification example of the second embodiment of this invention. FIG. 9 is a view illustrating a steam flow of an inter-device heat medium supply unit according to a second modification example of the second embodiment of this invention. The first modification example and the second modification example according to the second embodiment show a case where every four systems are provided for the modification examples. That is, two systems are added to the second embodiment.

In an inter-device heat medium supply unit 504E according to the first modification example illustrated in FIG. 8, E1 and E3 of a first supply unit 70E mean a steam flow supplied from two mutually different systems which are in an operation state, and E2 and E4 mean a steam flow toward two mutually different systems which are in a non-operation state. E1 and E2 are the same as those according to the second embodiment (hereinafter, the same applies to C1 and C2, and B1 and B2).

C1 and C3 of a second supply unit 71E mean a steam flow supplied from the two mutually different systems which are in an operation state, and C2 and C4 mean a steam flow toward the two mutually different systems which are in a non-operation state. B1 and B3 of a third supply unit 72E mean a steam flow supplied from the two mutually different systems which are in an operation state, and B2 and B4 mean a steam flow toward the two mutually different systems which are in a non-operation state. That is, according to the first modification example of the second embodiment, the steam of the two systems which are in an operation state is supplied to the two systems which are in a non-operation state and is utilized for preheating.

In contrast, in the first supply unit 70E of an inter-device heat medium supply unit 504F according to the second modification example illustrated in FIG. 9, only E1 is in an operation state, and E2 to E4 are in a non-operation state. Similarly, in a second supply unit 71F, only C1 is in an operation state, and C2 to C4 are in a non-operation state. Furthermore, in a third supply unit 72F, only B1 is in an operation state, and B2 to B4 are in a non-operation state. That is, according to the second modification example of the second embodiment, the steam of one system which is in an operation state is distributed and supplied to three systems which are in a non-operation state and is utilized for preheating. FIGS. 8 and 9 are examples, and the number of systems may be changed as appropriate.

Third Embodiment

Figure 10:
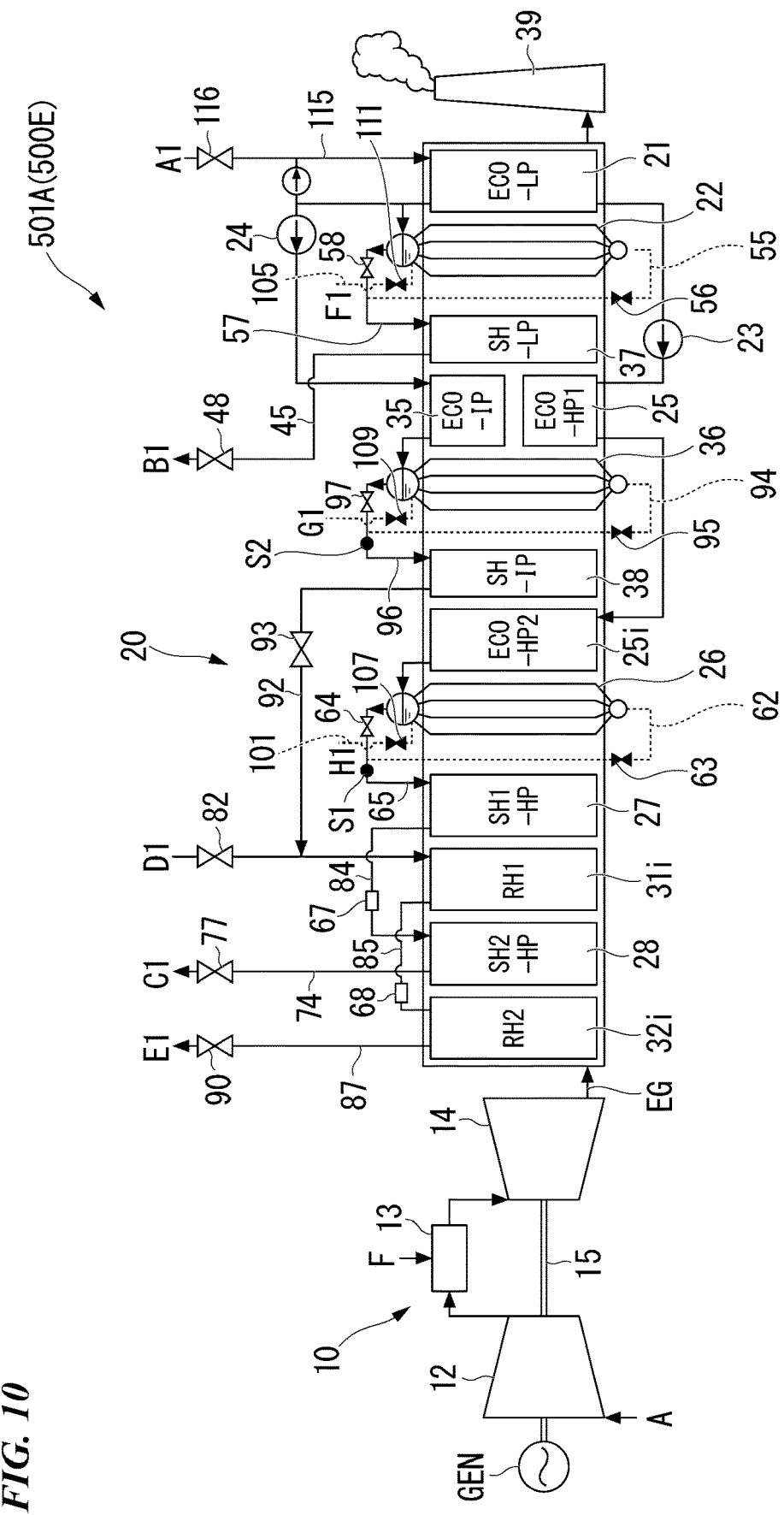
FIG. 10 is a view corresponding to FIG. 1 of a gas turbine exhaust heat recovery plant according to a third embodiment of this invention.
Figure 11:
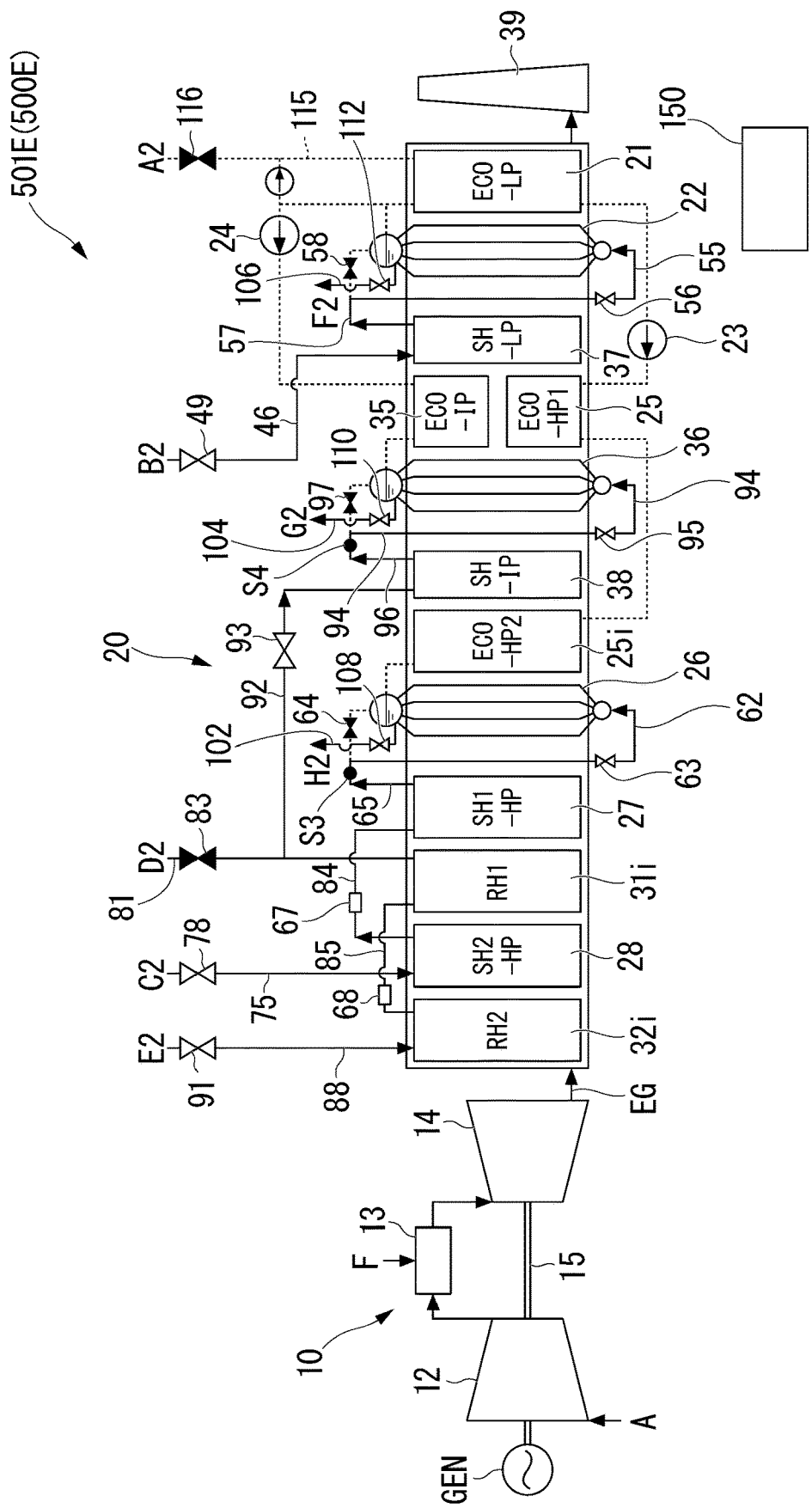
FIG. 11 is a view corresponding to FIG. 2 of the gas turbine exhaust heat recovery plant according to the third embodiment of this invention.

Next, a gas turbine exhaust heat recovery plant according to a third embodiment of this invention will be described with reference to the drawings. The third embodiment is different from the first embodiment described above in that preheating is controlled in accordance with a steam temperature between the superheater and the evaporator in the gas turbine exhaust heat recovery device which is in a non-operation state. Therefore, the same reference numerals will be given to the same elements as those according to the first embodiment described above, and repeated description will be omitted. FIG. 10 is a view corresponding to FIG. 1 of the gas turbine exhaust heat recovery plant according to the third embodiment of this invention. FIG. 11 is a view corresponding to FIG. 2 of the gas turbine exhaust heat recovery plant according to the third embodiment of this invention.

As illustrated in FIGS. 10 and 11, a gas turbine exhaust heat recovery plant 500E according to the third embodiment includes a plurality of temperature sensors S1 to S4 and a control device 150 (refer to FIG. 11) in addition to the configuration of the gas turbine exhaust heat recovery plant 500A according to the first embodiment. The steam-utilizing facility according to the third embodiment has the same configuration as the steam-utilizing facility 503 (refer to FIG. 3) according to the first embodiment, and thus, the illustration is omitted.

The temperature sensor S1 is attached to the pipeline 65 between the first high-pressure superheater 27 and the high-pressure evaporator 26 of the first gas turbine exhaust heat recovery device 501A. The temperature sensor S1 measures a temperature of the steam flowing inside the pipeline 65 of the first gas turbine exhaust heat recovery device 501A and outputs a measurement result to the control device 150. The temperature sensor S2 is attached to the pipeline 96 between the medium-pressure superheater 38 and the medium-pressure evaporator 36 of the first gas turbine exhaust heat recovery device 501A. The temperature sensor S2 measures a temperature of the steam flowing inside the pipeline 96 of the first gas turbine exhaust heat recovery device 501A and outputs a measurement result to the control device 150.

The temperature sensor S3 is attached to the pipeline 65 between the first high-pressure superheater 27 and the high-pressure evaporator 26 of the second gas turbine exhaust heat recovery device 501B. The temperature sensor S3 measures a temperature of the steam flowing inside the pipeline 65 (involved portion) of the second gas turbine exhaust heat recovery device 501B and outputs a measurement result to the control device 150. The temperature sensor S4 is attached to the pipeline 96 between the medium-pressure superheater 38 and the medium-pressure evaporator 36 of the second gas turbine exhaust heat recovery device 501B. The temperature sensor S4 measures a temperature of the steam flowing inside the pipeline 96 (involved portion) of the second gas turbine exhaust heat recovery device 501B and outputs a measurement result to the control device 150.

The control device 150 controls the first gas turbine exhaust heat recovery device 501A and the second gas turbine exhaust heat recovery device 501B. The control device 150 controls the first desuperheater 67 and the second desuperheater 68, based on the measurement result of the temperature sensors S3 and S4 of the gas turbine exhaust heat recovery device 501 which is in a non-operation state, that is, the second gas turbine exhaust heat recovery device 501B according to the third embodiment. Specifically, in the control device 150, the steam temperature measured by the temperature sensor S3 is set so that a degree of superheat (difference between the steam temperature and the saturation temperature) is constant (greater value than 0, for example, approximately 10° C.). For example, as the first desuperheater 67 and the second desuperheater 68, it is possible to use those in which a temperature reduction amount of the steam can be adjusted using water spray. Here, instead of the first desuperheater 67 and the second desuperheater 68, an electromagnetic valve capable of adjusting a steam flow rate may be used. Inflowing thermal energy can be reduced by reducing the steam flow rate. Accordingly, the same advantageous effect can be obtained compared to the advantageous effect obtained when increasing the temperature reduction amount. If a pressure sensor is installed at the same location as the temperature sensor S1 to S4, the saturation temperature can be obtained based on the measured steam pressure, and the degree of superheat can be easily calculated.

Therefore, according to the third embodiment, when the temperature of the steam flowing into the gas turbine exhaust heat recovery device 501 which is in a non-operation state varies, it is possible to suppress an excessive increase in the temperature of the steam flowing into the high-pressure evaporator 26 and the medium-pressure evaporator 36 of the gas turbine exhaust heat recovery device 501 which is in a non-operation state. Therefore, it is possible to suppress an increase in the thermal stress of the high-pressure evaporator 26 and the medium-pressure evaporator 36. Since a constant degree of superheat is maintained, it is possible to prevent condensation inside the system. Therefore, it is possible to suppress an increase in the thermal stress by preventing condensation heat caused by condensation and absorption of vaporization heat caused by re-evaporation of the condensed water. Furthermore, it is possible to prevent the pipeline from being blocked due to the condensed water, and it is possible to prevent a possibility that the preheating according to the present invention may not normally function.

In the third embodiment, a case has been described where the first gas turbine exhaust heat recovery device 501A and the second gas turbine exhaust heat recovery device 501B are provided as the two gas turbine exhaust heat recovery devices. However, as in the first embodiment or the second embodiment, the number of the gas turbine exhaust heat recovery devices is not limited to two. As in the high-pressure evaporator 26 and the medium-pressure evaporator 36, the low-pressure evaporator 22 may be controlled so that the steam temperature is not excessively high.

When in an operation state, the control device 150 may manage an operation state, may identify the gas turbine exhaust heat recovery device which is in a non-operation state, may operate each valve of the gas turbine exhaust heat recovery device which is in an operation state so that an open/closed state is the same as that of the first gas turbine exhaust heat recovery device 501A according to the third embodiment, and may operate each valve of the gas turbine exhaust heat recovery device which is in a non-operation state so that the open/closed state is the same as that of the second gas turbine exhaust heat recovery device 501B according to the third embodiment. The control device 150 may measure the exhaust gas temperature in the gas turbine outlet, may bring the gas turbine exhaust heat recovery device which falls below a predetermined threshold while operating the gas turbine exhaust heat recovery device in which the exhaust gas temperature in the gas turbine outlet is equal to or greater than the predetermined threshold, and may identify each gas turbine exhaust heat recovery device when in an operation state and when in a non-operation state. Furthermore, for example, a list of the gas turbine exhaust heat recovery devices that do not allow the steam to flow therein due to failure or inspection, that is, a list of the gas turbine exhaust heat recovery devices that pauses the operation may be input to the control device 150. Regardless of an operation example of each valve of the gas turbine exhaust heat recovery devices which are in a non-operation state, the control device 150 may operate the gas turbine exhaust heat recovery device included in the list of the gas turbine exhaust heat recovery device that pauses the operation so as to close all of the valves of the gas turbine exhaust heat recovery device included in the list.

Fourth Embodiment

Next, a gas turbine exhaust heat recovery plant according to a fourth embodiment of this invention will be described with reference to the drawings. Only a configuration of the inter-device heat medium supply unit in the gas turbine exhaust heat recovery plant according to the fourth embodiment is different from that according to the second embodiment described above. Therefore, the same reference numerals will be given to the same elements as those according to the second embodiment described above, and repeated description will be omitted. In describing the fourth embodiment, only the gas turbine exhaust heat recovery device 501 which is in an operation state is illustrated, and the gas turbine exhaust heat recovery device 501 which is in a non-operation state is omitted.

Figure 12:
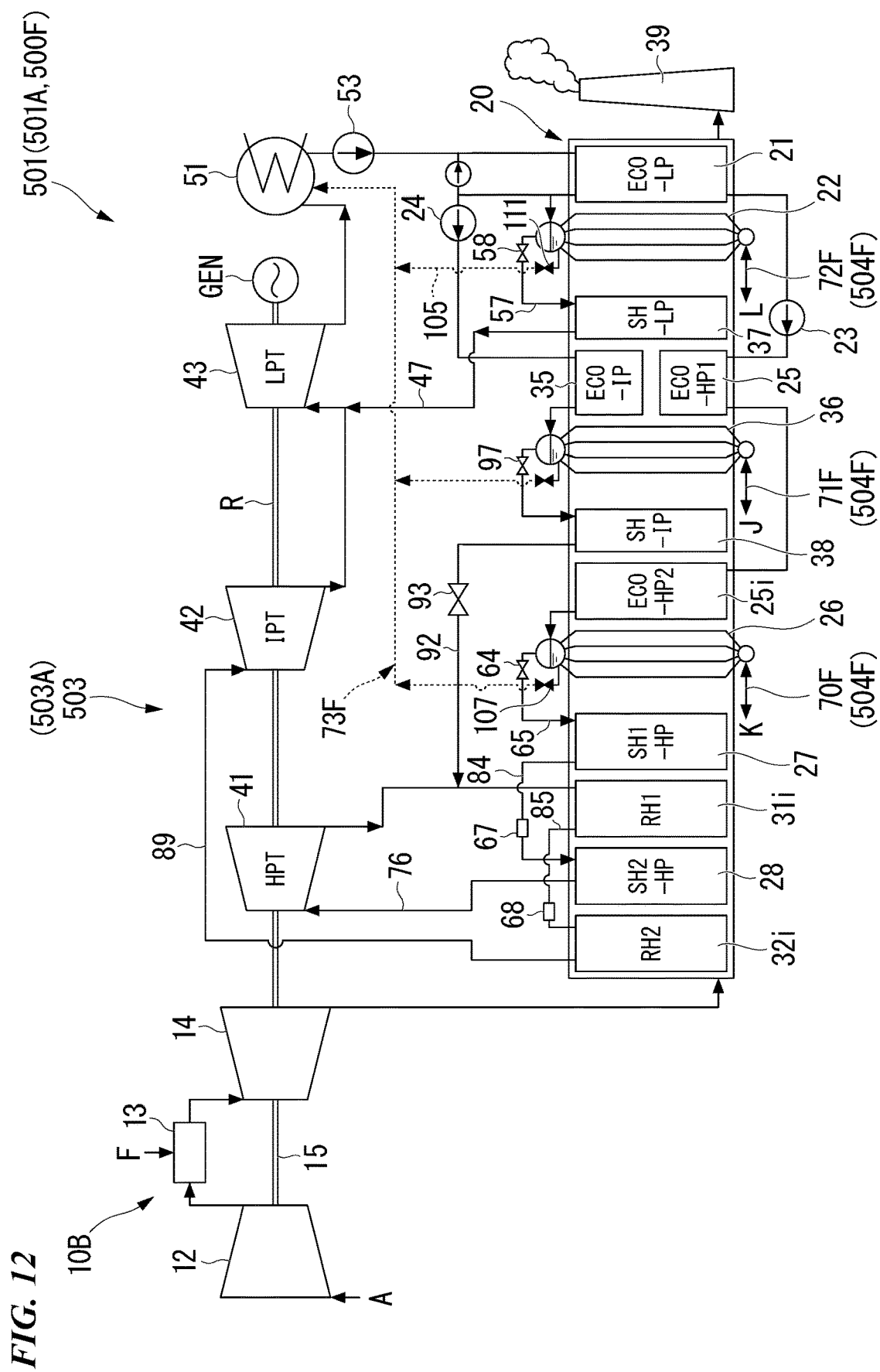
FIG. 12 is a configuration diagram illustrating a schematic configuration of a gas turbine exhaust heat recovery plant which is in an operation state according to a fourth embodiment of this invention.

FIG. 12 is a configuration diagram illustrating a schematic configuration of the gas turbine exhaust heat recovery plant which is in an operation state according to the fourth embodiment of this invention. As illustrated in FIG. 12, a gas turbine exhaust heat recovery plant 500F according to the fourth embodiment includes the first gas turbine exhaust heat recovery device 501A, the second gas turbine exhaust heat recovery device 501B (not illustrated), the steam-utilizing facilities 503A and 503B (not illustrated), an inter-device heat medium supply unit 504F, and a condensate return unit 73F.

The first gas turbine exhaust heat recovery device 501A is the gas turbine exhaust heat recovery device 501 which is in an operation state, and the second gas turbine exhaust heat recovery device 501B (not illustrated) is the gas turbine exhaust heat recovery device 501 which is in a non-operation state. The steam-utilizing facilities 503 (503A and 503B (not illustrated)) is connected one by one to the gas turbine exhaust heat recovery device 501. The first gas turbine exhaust heat recovery device 501A which is in an operation state supplies all generated steam to the steam-utilizing facility 503A.

The inter-device heat medium supply unit 504F causes the water heated by at least one of the gas turbine exhaust heat recovery devices 501 in the gas turbine exhaust heat recovery plant 500F to flow into the other gas turbine exhaust heat recovery device 501. According to the fourth embodiment, the inter-device heat medium supply unit 504F causes the water heated by the first gas turbine exhaust heat recovery device 501A which is in an operation state to flow into the second gas turbine exhaust heat recovery device 501B (not illustrated).

The inter-device heat medium supply unit 504F according to the fourth embodiment includes the first supply unit 70F, the second supply unit 71F, and the third supply unit 72F. The first supply unit 70F causes a portion of the water stored in the lower portion of the high-pressure evaporator 26 of the first gas turbine exhaust heat recovery device 501A to flow into the lower portion (refer to K in FIG. 12) of the high-pressure evaporator 26 of the second gas turbine exhaust heat recovery device 501B which is in a non-operation state. The second supply unit 71F causes a portion of the water stored in the lower portion of the medium-pressure evaporator 36 of the first gas turbine exhaust heat recovery device 501A to flow into the lower portion (refer to J in FIG. 12) of the medium-pressure evaporator 36 of the second gas turbine exhaust heat recovery device 501B which is in a non-operation state. The third supply unit 72F causes a portion of the water stored in the lower portion of the low-pressure evaporator 22 of the first gas turbine exhaust heat recovery device 501A to flow into the lower portion (refer to L in FIG. 12) of the low-pressure evaporator 22 of the second gas turbine exhaust heat recovery device 501B which is in a non-operation state. Here, in each of the first gas turbine exhaust heat recovery device 501A and the second gas turbine exhaust heat recovery device 501B, the high-pressure evaporator 26 is the highest-pressure evaporator among the high-pressure evaporator 26, the medium-pressure evaporator 36, and the low-pressure evaporator 22.

The condensate return unit 73F returns the water supplied to the second gas turbine exhaust heat recovery device 501B which is in a non-operation state, to the steam condenser 51 via the inter-device heat medium supply unit 504F. The condensate return unit 73F according to the fourth embodiment returns the water contained inside each drum of the high-pressure evaporator 26, the medium-pressure evaporator 36, and the low-pressure evaporator 22 of the second gas turbine exhaust heat recovery device 501B, to the steam condenser 51. As in the first embodiment, the condensate return unit 73 includes the plurality of valves 107 to 112 which open and close the flow path for the steam condenser 51 so as to function only when the gas turbine exhaust heat recovery device 501 is in a non-operation state.

Therefore, according to the fourth embodiment described above, the second gas turbine exhaust heat recovery device 501B can be preheated by utilizing a portion of the water heated by the first gas turbine exhaust heat recovery device 501A. As a result, the temperature drop is suppressed in the second gas turbine exhaust heat recovery device 501B. Accordingly, the life consumption rate can be reduced by suppressing the thermal stress resulting from sudden output variations.

Furthermore, the high-temperature water heated by the first gas turbine exhaust heat recovery device 501A can be supplied to each lower portion of the high-pressure evaporator 26, the medium-pressure evaporator 36, and the low-pressure evaporator 22 of the second gas turbine exhaust heat recovery device 501B. Therefore, the high-temperature water for preheating can flow toward the drum from the lower portion of the high-pressure evaporator 26, the medium-pressure evaporator 36, and the low-pressure evaporator 22. In particular, each drum having large heat capacity can be kept warm. As a result, when started up, the steam-utilizing facility 503 can be started up in a short time so as to quickly increase the output. In particular, when in a non-operation state, the high-temperature water for preheating can be supplied to the high-pressure evaporator 26 of the second gas turbine exhaust heat recovery device 501B, which is the highest-pressure evaporator, and which is exposed to the highest-temperature exhaust gas in order to generate the steam at the highest saturation temperature when in an operation state. Therefore, when in a non-operation state, the thermal drop is suppressed in the high-pressure evaporator 26 of the second gas turbine exhaust heat recovery device 501B. In this manner, the thermal stress can be reduced in the high-pressure evaporator 26 exposed to the highest-temperature exhaust gas when started up.

The water having higher density than the steam is used for preheating. Accordingly, compared to a case of using the steam as in the first to third embodiments, the pipeline used for the inter-device heat medium supply unit 504F can be reduced in size.

The above-described fourth embodiment in which preheating is performed using the water may be used in combination with a configuration in which preheating is performed using the steam as in the first to third embodiments. As in the first embodiment or the second embodiment, the number of the gas turbine exhaust heat recovery devices 501 is not limited to two. The embodiment is also applicable to a case where one steam-utilizing facility 503 includes the plurality of gas turbine exhaust heat recovery devices 501.

Fifth Embodiment

Next, a gas turbine exhaust heat recovery plant according to a fifth embodiment of this invention will be described with reference to the drawings. The gas turbine exhaust heat recovery plant according to the fifth embodiment is configured so that a steam mixing pipeline is provided for the gas turbine exhaust heat recovery plant according to the first embodiment described above. Therefore, the same reference numerals will be given to the same elements as those according to the first embodiment described above, and repeated description will be omitted. In describing the fifth embodiment, a case where all of the plurality of gas turbine exhaust heat recovery devices 501 are in an operation state will be described as an example. All of the plurality of gas turbine exhaust heat recovery devices 501 have the same configuration. Accordingly, only one of the gas turbine exhaust heat recovery devices 501 is illustrated, and the other gas turbine exhaust heat recovery device 501 is omitted in the illustration.

Figure 13:
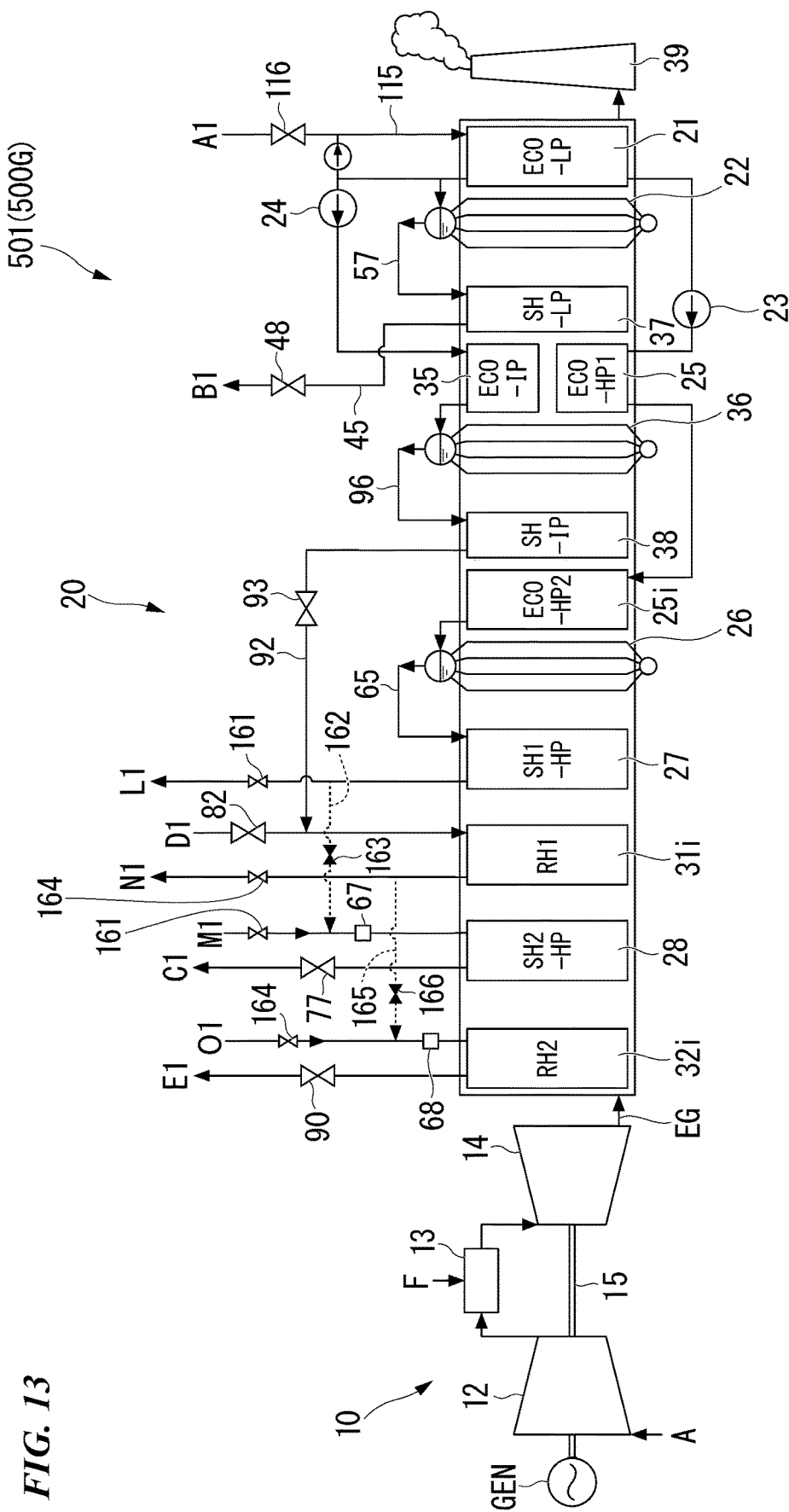
FIG. 13 is a configuration diagram illustrating a schematic configuration of a gas turbine exhaust heat recovery plant according to a fifth embodiment of this invention.
Figure 14:
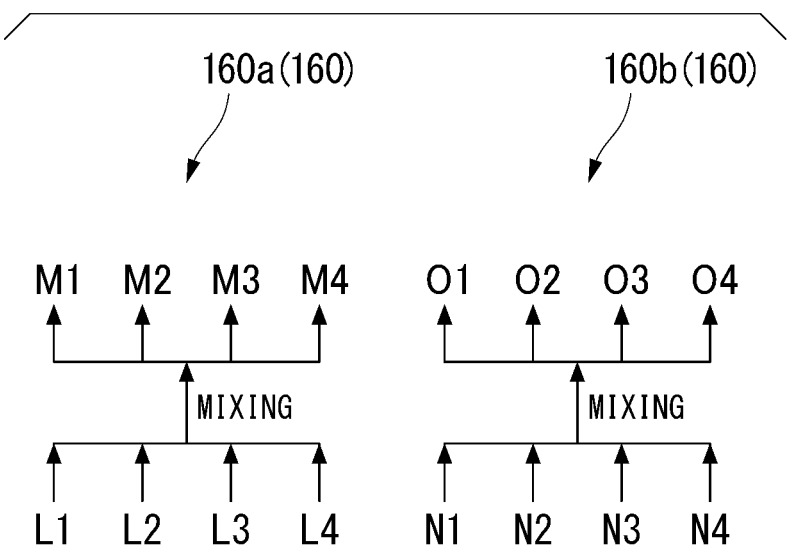
FIG. 14 is a view illustrating a schematic configuration of a steam mixing pipeline according to the fifth embodiment of this invention.

FIG. 13 is a configuration diagram illustrating a schematic configuration of the gas turbine exhaust heat recovery plant according to the fifth embodiment of this invention. FIG. 14 is a view illustrating a schematic configuration of a steam mixing pipeline according to the fifth embodiment of this invention. A gas turbine exhaust heat recovery plant 500G according to the fifth embodiment includes four gas turbine exhaust heat recovery devices 501 illustrated in FIG. 13. The gas turbine exhaust heat recovery plant 500G includes a mixing pipeline 160.

The gas turbine exhaust heat recovery device 501 includes the gas turbine 10 and the exhaust heat recovery boiler 20. The exhaust heat recovery boiler 20 has the same configuration as the exhaust heat recovery boiler according to the first embodiment, and has the low-pressure economizer (ECO-LP) 21, the low-pressure evaporator 22, the medium-pressure pump 24, the high-pressure pump 23, the first high-pressure economizer (ECO-HP1) 25, the medium-pressure economizer (ECO-IP) 35, the medium-pressure evaporator 36, the medium-pressure superheater (SH1-IP) 38, the low-pressure superheater (SH1-LP) 37, the second high-pressure economizer (ECO-HP2) 25$i$, the high-pressure evaporator 26, the first high-pressure superheater (SH1-HP) 27, the first reheater (RH1) 31$i$, the second high-pressure superheater (SH2-HP) 28, and the second reheater (RH2) 32$i$.

As illustrated in FIG. 14, the mixing pipeline 160 mixes the steam generated by the plurality of gas turbine exhaust heat recovery devices 501 and distributes the steam to each of the gas turbine exhaust heat recovery devices 501. The gas turbine exhaust heat recovery plant 500G according to the fifth embodiment includes a first mixing pipeline 160$a$ and a second mixing pipeline 160$b$ as the mixing pipeline 160. The first mixing pipeline 160$a$ and the second mixing pipeline 160$b$ mix and distribute the steam at mutually different locations.

The first mixing pipeline 160$a$ merges (mixes) the steam superheated by the first high-pressure superheater 27 of the four gas turbine exhaust heat recovery devices 501. It means that L1 to L4 in FIG. 14 are connected to the first high-pressure superheaters 27 of the mutually different gas turbine exhaust heat recovery devices 501.

Furthermore, the first mixing pipeline 160$a$ distributes the merged (mixed) steam to each second high-pressure superheater 28 of the four gas turbine exhaust heat recovery devices 501. It means that M1 to M4 in FIG. 14 are connected to the second high-pressure superheaters 28 of the mutually different gas turbine exhaust heat recovery devices 501.

The pipelines provided with the letters L1 to L4 and M1 to M4 in FIG. 14 have an opening/closing valve 161 (refer to FIG. 13) for opening and closing each internal flow path. When the operated gas turbine exhaust heat recovery device 501 is in a non-operation state, the opening/closing valve 161 is in a closed state.

As illustrated in FIG. 13, according to the fifth embodiment, there are provided a bypass line 162 that bypasses between L1 and M1, L2 and M2, L3 and M3, and L4 and M4, and an opening/closing valve 163 that opens and closes the bypass line 162. Since the bypass line 162 and the opening/closing valve 163 are provided, if the opening/closing valve 163 is opened when inspecting or repairing a partial system, out of the plurality of systems of the gas turbine exhaust heat recovery device 501, it is possible to bypass the first mixing pipeline 160$a$. The opening/closing valve 163 is in a closed state during normal operation.

The second mixing pipeline 160$b$ merges (mixes) the steam superheated by the respective first reheaters 31$i$ of the four gas turbine exhaust heat recovery devices 501 (N1 to N4). As in L1 to L4 of the first mixing pipeline 160$a$, it means that N1 to N4 in FIG. 14 are connected to the first reheaters 31$i$ of the mutually different gas turbine exhaust heat recovery devices 501.

The second mixing pipeline 160$b$ distributes the steam obtained by merging (mixing) N1, to N4 to each second reheater 32$i$ of the four gas turbine exhaust heat recovery devices 501 (O1 to O4). It means that O1 to O4 in FIG. 14 are connected to the second reheaters 32*i* of the mutually different first gas turbine exhaust heat recovery devices 501A.

The pipelines provided with the letters N1 to N4 and O1 to O4 in FIG. 14 have an opening/closing valve 164 (refer to FIG. 13) for opening and closing each internal flow path. When the operated gas turbine exhaust heat recovery device 501 is in a non-operation state, the opening/closing valve 164 is in a closed state.

According to the fifth embodiment, there are provided a bypass line 165 (refer to FIG. 13) that bypasses between N1 and O1, N2 and O2, N3 and O3, and N4 and O4, and an opening/closing valve 166 (refer to FIG. 13) that opens and closes the bypass line 165. Since the bypass line 165 and the opening/closing valve 166 are provided, for example, a partial system of a plurality of systems of the gas turbine exhaust heat recovery devices 501 is opened when inspecting or repairing. In this manner, it is possible to bypass the second mixing pipeline 160*b*. The opening/closing valve 166 is in a closed state during normal operation.

Here, it means that E1, D1, B1, and A1 illustrated in FIG. 13 are connected at the same locations as E1, D1, B1, and A1 of the exhaust heat recovery boiler 20 according to the first embodiment described above.

Therefore, according to the fifth embodiment, the mixing pipeline 160 is provided. Accordingly, even if some of the gas turbines 10 are rapidly started up and the output is suddenly changed, it is possible to prevent a sudden temperature change in the steam flowing into the second high-pressure superheater 28 or the steam flowing into the second reheater 32*i*. Therefore, the temperature is gently changed in the second high-pressure superheater 28, the exhaust gas upstream portion of the second reheater 32*i*, and the high-pressure steam turbine 41 and the medium-pressure steam turbine 42 of the steam-utilizing facility 503, which particularly likely to have a high-temperature in the gas turbine exhaust heat recovery device 501. Accordingly, the thermal stress can be reduced.

(Modification Example of Fifth Embodiment)

Figure 15:
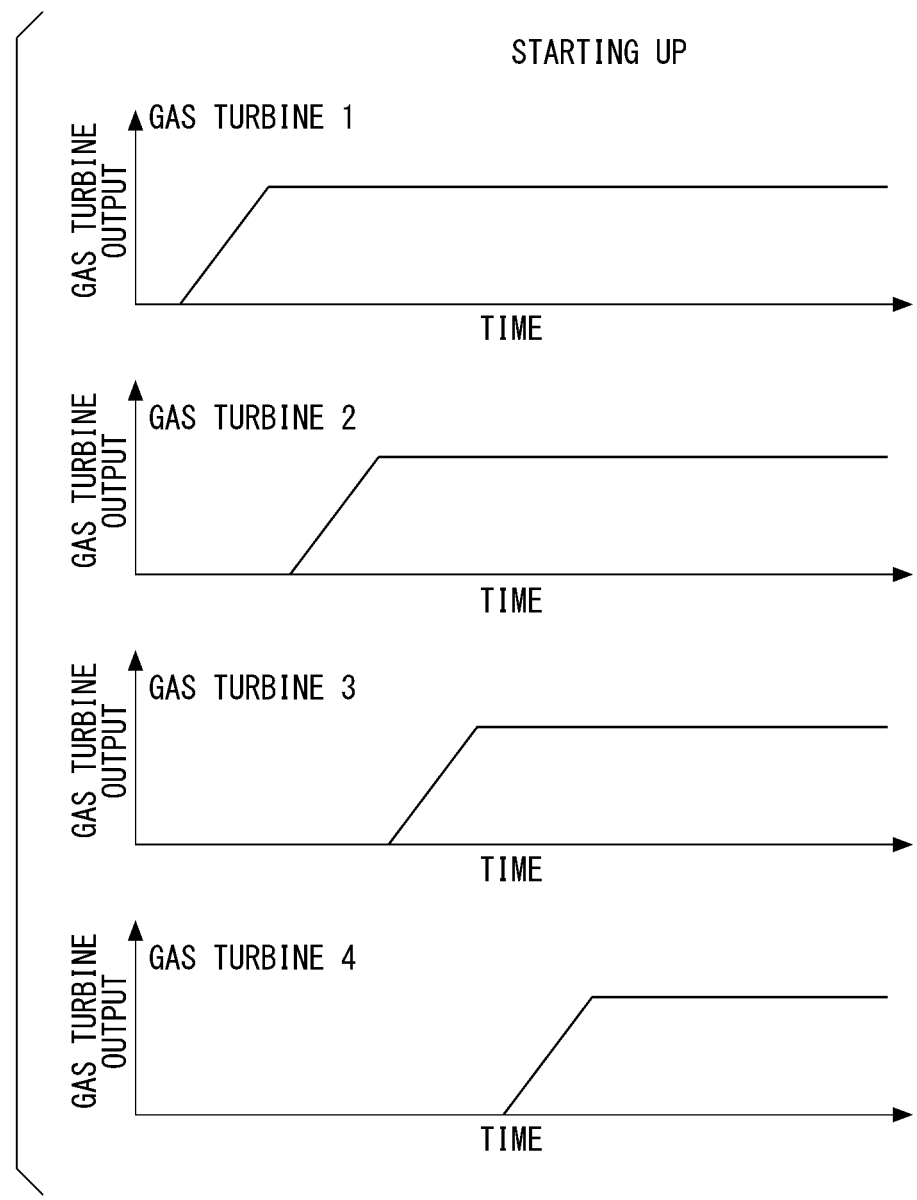
FIG. 15 is a graph illustrating timing for starting up a plurality of gas turbines according to a modification example of the fifth embodiment of this invention.
Figure 16:
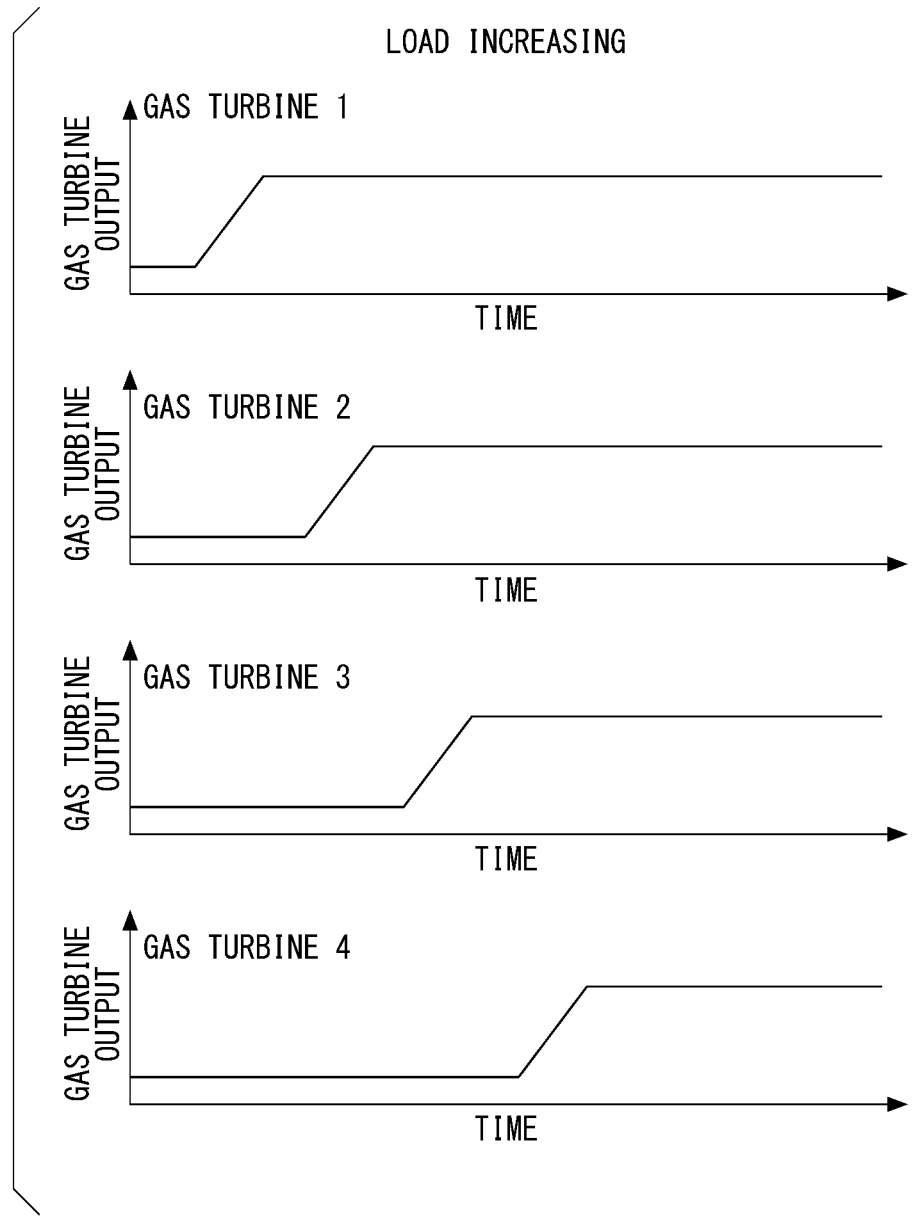
FIG. 16 is a graph illustrating timing for increasing a load of the plurality of gas turbines according to the modification example of the fifth embodiment of this invention.

FIG. 15 is a graph illustrating timing for starting up a plurality of gas turbines according to a modification example of the fifth embodiment of this invention. FIG. 16 is a graph illustrating timing for increasing a load of the plurality of gas turbines according to the modification example of the fifth embodiment of this invention. For example, as illustrated in FIGS. 15 and 16, in the gas turbine exhaust heat recovery plant 500G according to the fifth embodiment described above, the control device 150 may shift the timing for starting up and the timing for increasing the load of the four gas turbines 10 (indicating the gas turbine 1 to the gas turbine 4 in FIGS. 15 and 16). Here, increasing the load is increasing the load of the gas turbine 10.

The modification example according to the fifth embodiment is configured in this way. Accordingly, the temperatures of the steam superheated by the four first high-pressure superheaters 27 are respectively raised in a time interval difference mode. Similarly, the temperatures of the steam superheated by the first reheater 31*i* are respectively raised in the time interval difference mode. Therefore, it is possible to suppress a sudden change in the temperature of the steam to be mixed and distributed in the mixing pipeline 160.

Figure 22:
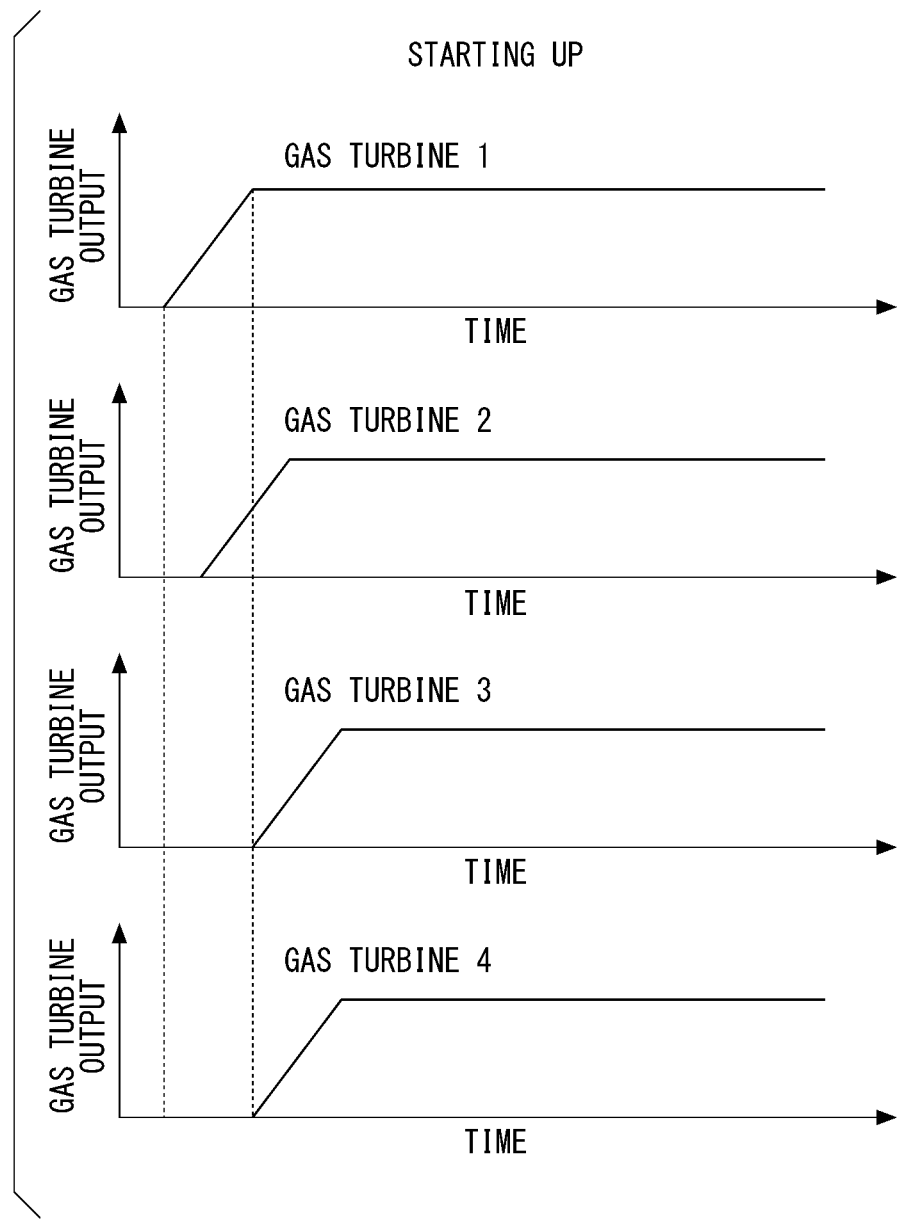
FIG. 22 is a graph illustrating timing for starting up a plurality of gas turbines according to another aspect of the embodiment of this invention.
Figure 23:
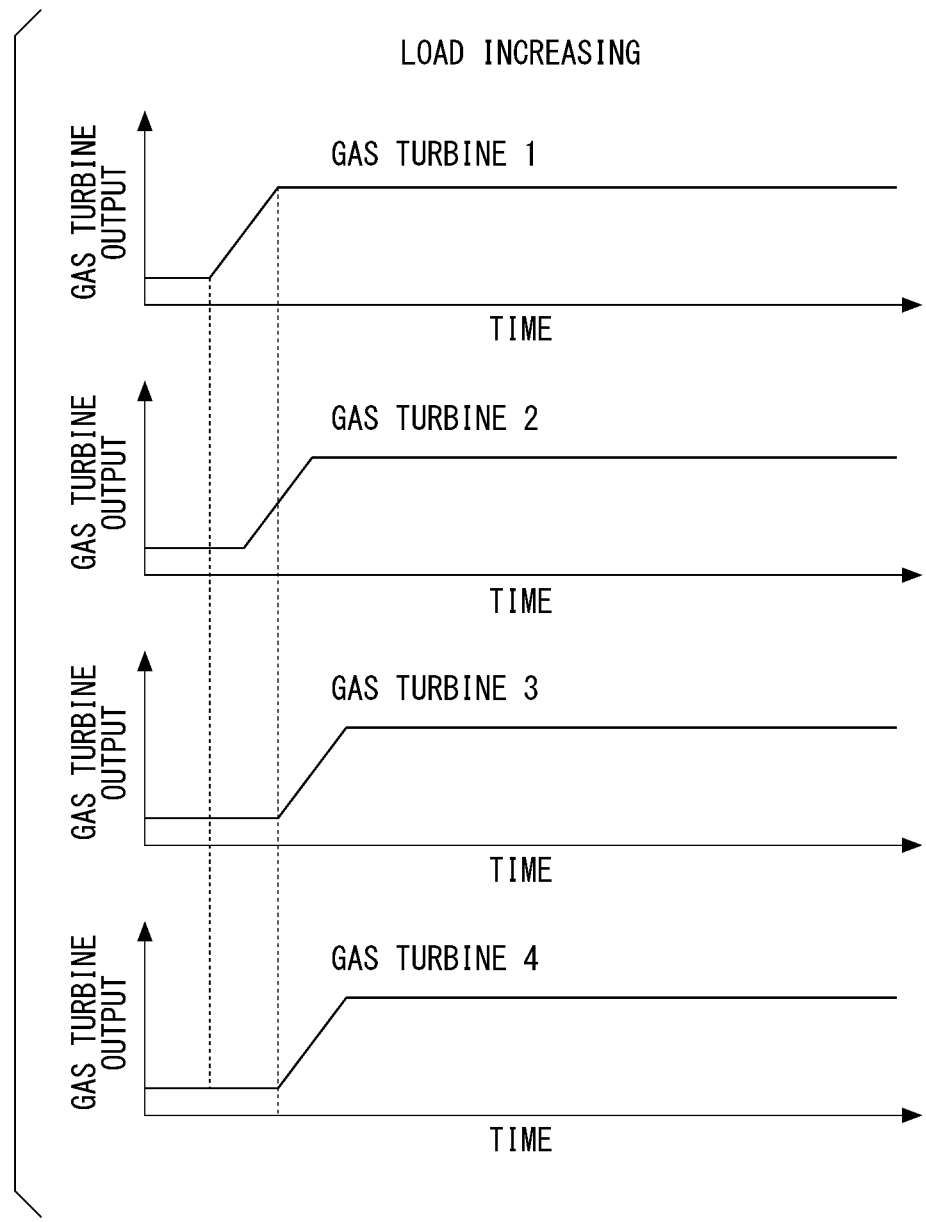
FIG. 23 is a graph illustrating timing for increasing a load of the plurality of gas turbines according to another aspect of the embodiment of this invention.

In the modification example according to the fifth embodiment described above, a case has been described where the timing for starting up the gas turbine is shifted and the timing for increasing the load is shifted. However, either the timing for starting up the gas turbine or the timing for increasing the load may be shifted. In the fifth embodiment, a case where the four gas turbine exhaust heat recovery devices 501 are provided has been described as an example. However, the number of the gas turbine exhaust heat recovery devices 501 is not limited to four as long as the plurality of gas turbine exhaust heat recovery devices 501 are provided. The configuration of the mixing pipeline 160 according to the fifth embodiment may be used in proper combination with the configurations according to the first to fourth embodiments described above. As in the gas turbine 1 and the gas turbine 2 in FIGS. 22 and 23, the timings for starting up the gas turbine and the timings for increasing the load may partially overlap each other. As in the gas turbine 3 and the gas turbine 4 in FIGS. 22 and 23, the timings for starting up the gas turbine and the timings for increasing the load may coincide with each other. However, as illustrated in FIGS. 15 and 16, if the gas turbine is started up or the load is increased so that the timings for starting up all of the gas turbines and the timings for increasing the load do not overlap each other at all, it is possible to most effectively suppress a sudden temperature change in the steam. Therefore, advantageous effects can be achieved in that the thermal stress is reduced to the maximum and the life consumption rate is reduced.

Sixth Embodiment

Next, a gas turbine exhaust heat recovery plant according to a sixth embodiment of this invention will be described with reference to the drawings. The gas turbine exhaust heat recovery plant according to the sixth embodiment is configured so that an auxiliary boiler is connected to the gas turbine exhaust heat recovery plant according to the first modification example and the second modification example of the first embodiment described above. Therefore, the same reference numerals will be given to the same elements as those according to the first embodiment described above, and repeated description will be omitted. In describing the sixth embodiment, a case where all of the plurality of gas turbine exhaust heat recovery devices 501 are in a non-operation state will be described as an example. Furthermore, the gas turbine exhaust heat recovery device 501 according to the sixth embodiment has the same configuration as that according to the first modification example of the first embodiment, and thus, illustration thereof is omitted.

Figure 17:
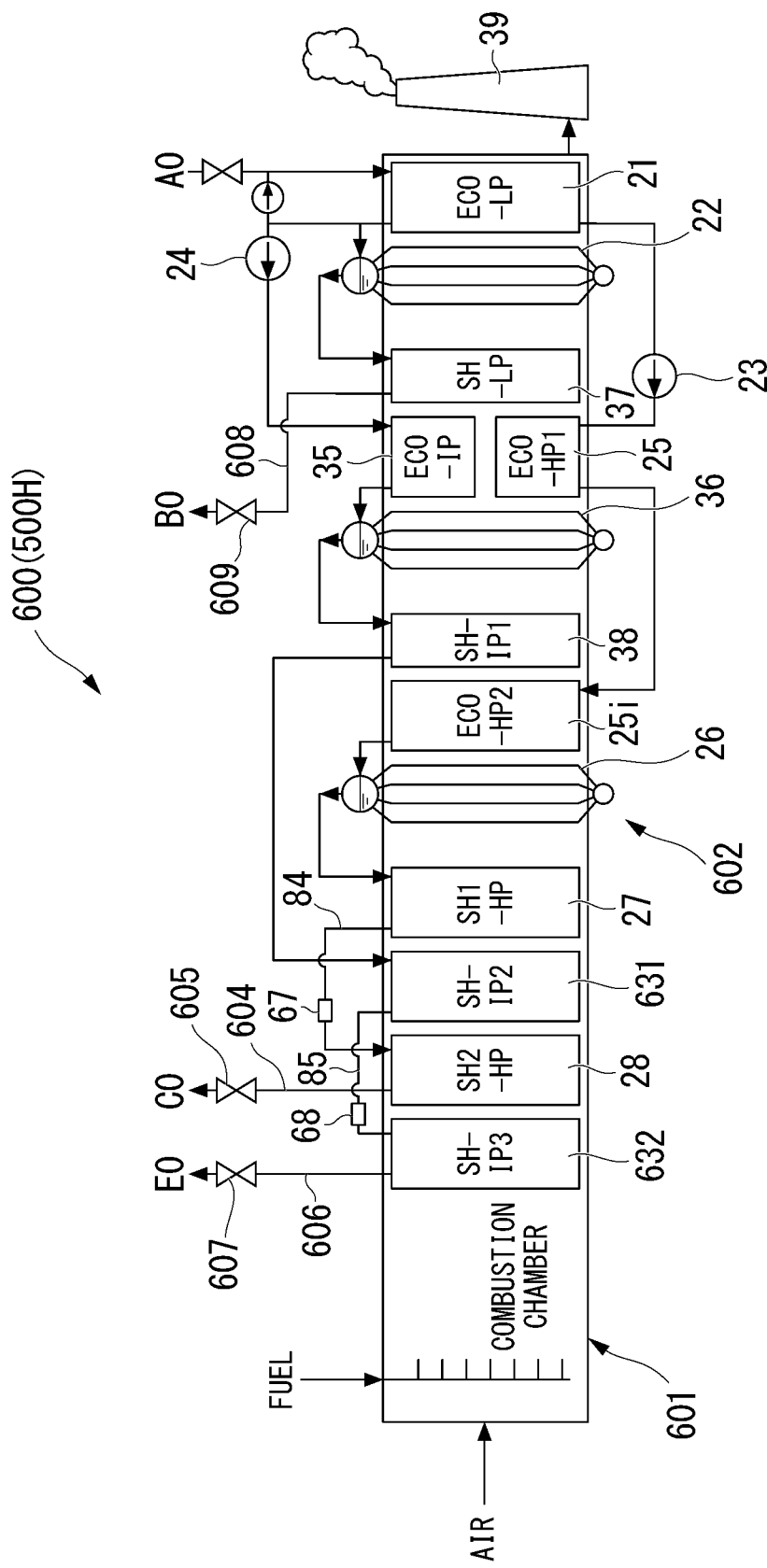
FIG. 17 is a view illustrating a schematic configuration of an auxiliary boiler of a gas turbine exhaust heat recovery plant according to a sixth embodiment of this invention.
Figure 18:
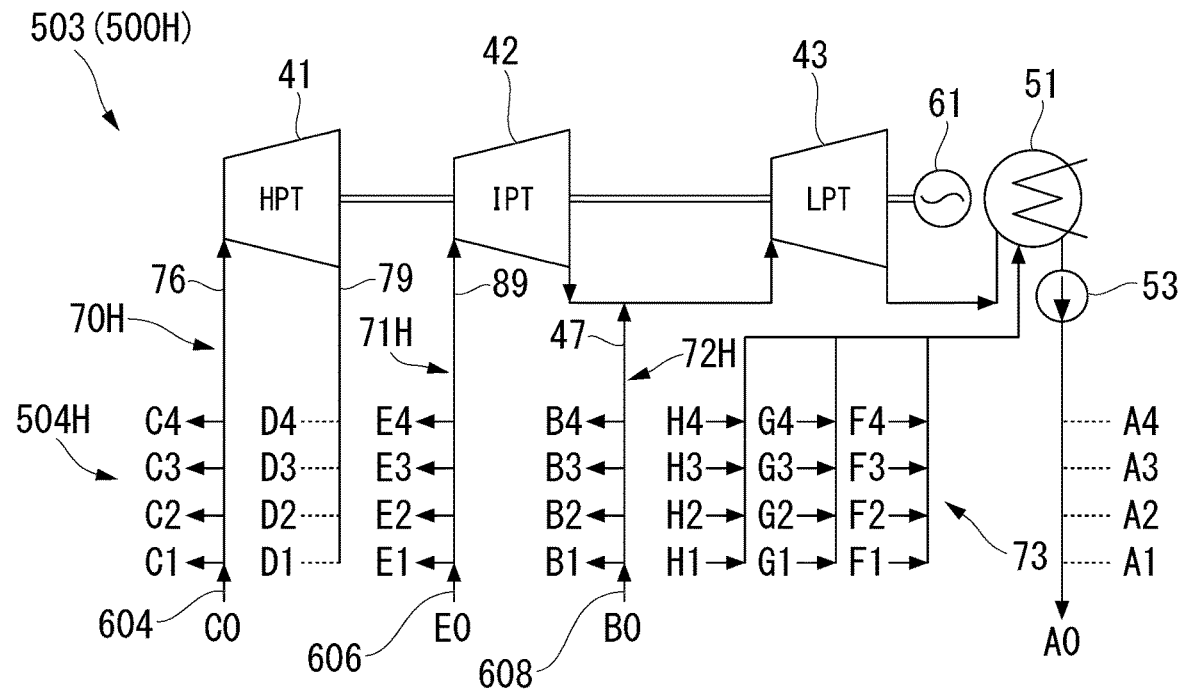
FIG. 18 is a view corresponding to FIG. 3 of a steam-utilizing facility according to a sixth embodiment of this invention.

FIG. 17 is a view illustrating a schematic configuration of the auxiliary boiler of the gas turbine exhaust heat recovery plant according to the sixth embodiment of this invention. FIG. 18 is a view corresponding to FIG. 3 of a steam-utilizing facility according to the sixth embodiment of this invention. As illustrated in FIGS. 17 and 18, a gas turbine exhaust heat recovery plant 500H according to the sixth embodiment includes four gas turbine exhaust heat recovery devices 501, one auxiliary boiler 600, and one steam-utilizing facility 503, and an inter-device heat medium supply unit 504H. The gas turbine exhaust heat recovery device 501 and the steam-utilizing facility 503 have the same configuration as those according to the above-described embodiments, and thus, detailed description thereof is omitted. The number of the gas turbine exhaust heat recovery devices 501 is not limited to four as long as the plurality of gas turbine exhaust heat recovery devices 501 are provided.

As illustrated in FIG. 17, the auxiliary boiler 600 includes a combustion chamber (heat source) 601 and a boiler body 602. The combustion chamber 601 generates high-temperature combustion gas by mixing fuel with air. The combustion gas is supplied to the boiler body 602.

The boiler body 602 has the same configuration as that of the exhaust heat recovery boiler 20 according to the first embodiment described above except that the steam is generated using the combustion gas generated by the combustion chamber 601.

the boiler body 602 has the low-pressure economizer (ECO-LP) 21, the low-pressure evaporator 22, the medium-pressure pump 24, the high-pressure pump 23, the first high-pressure economizer (ECO-HP1) 25, the medium-pressure economizer (ECO-IP) 35, the medium-pressure evaporator 36, the first medium-pressure superheater (SH1-IP) 38, the low-pressure superheater (SH1-LP) 37, the second high-pressure economizer (ECO-HP2) 25i, the high-pressure evaporator 26, the first high-pressure superheater (SH1-HP) 27, the second medium-pressure superheater (SH-IP2) 631, the second high-pressure superheater (SH2-HP) 28, and the third medium-pressure superheater (SH-1P3) 632. Here, in the boiler body 602 of the auxiliary boiler 600, the first reheater 31i and the second reheater 32i of the exhaust heat recovery boiler 20 described above are respectively replaced with the second medium-pressure superheater 631 and the third medium-pressure superheater 632. The second medium-pressure superheater 631 and the third medium-pressure superheater 632 sequentially superheat the steam superheated by the first medium-pressure superheater 38.

As illustrated in FIG. 18, as in the inter-device heat medium supply unit 504 according to the first embodiment, the inter-device heat medium supply unit 504H is configured so that a portion of the steam superheated by at least one of the plurality of gas turbine exhaust heat recovery devices 501 can be supplied to the other gas turbine exhaust heat recovery device 501.

In addition to the inter-device heat medium supply unit 504 according to the first embodiment, the inter-device heat medium supply unit 504H is configured so that the steam generated by the auxiliary boiler 600 described above can flow into each of the exhaust heat recovery boiler 20 and the steam-utilizing facility 503 of the gas turbine exhaust heat recovery device 501 which is in a non-operation state.

The inter-device heat medium supply unit 504H includes a first supply unit 70H, a second supply unit 71H, a third supply unit 72H, and a condensate return unit 73. As in the first supply unit 70 according to the first embodiment, the first supply unit 70H is configured so that the steam superheated by the second high-pressure superheater 28 of the gas turbine exhaust heat recovery device 501 which is in an operation state can be supplied to each of the high-pressure steam turbines 41. Furthermore, the first supply unit 70H can supply the steam between the second high-pressure superheater 28 of the gas turbine exhaust heat recovery device 501 which is in an operation state and the gas turbine exhaust heat recovery device 501 which is in a non-operation state.

The first supply unit 70H is connected to the second high-pressure superheater 28 of the auxiliary boiler 600 via the pipeline 604 (refer to C0 in FIGS. 17 and 18) and is configured so that the steam superheated by the second high-pressure superheater 28 of the auxiliary boiler 600 can flow into the second high-pressure superheaters 28 (C1 to C4) of the four gas turbine exhaust heat recovery device 501 and the high-pressure steam turbine 41. Furthermore, the first supply unit 70H includes a valve 605 (refer to FIG. 17) in the pipeline 604 which connects the second high-pressure superheater 28 of the auxiliary boiler 600 and the high-pressure inlet pipeline 76 to each other. The valve 605 is in an open state when the auxiliary boiler 600 is driven, and otherwise, the valve 605 is basically in a closed state.

As in the second supply unit 71 according to the first embodiment, the second supply unit 71H is configured so that the steam superheated by the second high-pressure superheater 28 of the gas turbine exhaust heat recovery device 501 which is in an operation state can be supplied to each of the medium-pressure steam turbines 42. Furthermore, the second supply unit 71H can supply the steam between the second high-pressure superheater 28 of the gas turbine exhaust heat recovery device 501 which is in an operation state and the gas turbine exhaust heat recovery device 501 which is in a non-operation state. Here, the steam superheated by the third medium-pressure superheater 632 of the auxiliary boiler 600 flows into the medium-pressure inlet pipeline 89 via the pipeline 606.

The second supply unit 71H is connected to the third medium-pressure superheater 632 of the auxiliary boiler 600 via the pipeline 606 (refer to E0 in FIGS. 17 and 18), and is configured so that the steam superheated by the third medium-pressure superheater 632 of the auxiliary boiler 600 can flow into the second reheaters 32i (E1 to E4) of the four gas turbine exhaust heat recovery device 501 and the medium-pressure steam turbine 42. Furthermore, the second supply unit 71H includes a valve 607 in the pipeline 606 which connects the third medium-pressure superheater 632 of the auxiliary boiler 600 and the medium-pressure inlet pipeline 89 to each other. The valve 607 is in an open state when the auxiliary boiler 600 is driven, and otherwise, the valve 607 is basically in a closed state.

As in the third supply unit 72 according to the first embodiment, the third supply unit 72H is configured so that the steam superheated by the second high-pressure superheater 28 of the gas turbine exhaust heat recovery device 501 which is in an operation state can be supplied to each of the low-pressure steam turbines 43. Furthermore, the third supply unit 72H can supply the steam between the low-pressure superheater 37 of the gas turbine exhaust heat recovery device 501 which is in an operation state and the gas turbine exhaust heat recovery device 501 which is in a non-operation state.

The third supply unit 72H is connected to the low-pressure superheater 37 of the auxiliary boiler 600 via the pipeline 608 (refer to B0 in FIGS. 17 and 18) and is configured so that the steam superheated by the low-pressure superheater 37 of the auxiliary boiler 600 can flow into the low-pressure superheaters 37 (B1 to B4) of the four gas turbine exhaust heat recovery device 501 and the low-pressure steam turbine 43. Furthermore, the third supply unit 72H includes a valve 609 in the pipeline 608 which connects the low-pressure superheater 37 of the auxiliary boiler 600 and the low-pressure inlet pipeline 47 to each other. The valve 609 is in an open state when the auxiliary boiler 600 is driven, and otherwise, the valve 609 is basically in a closed state.

Here, each steam supplied to the four gas turbine exhaust heat recovery devices 501 is condensed after returning to the steam condenser 51 by the condensate return unit 73. When the auxiliary boiler 600 is driven, the water condensed by the steam condenser 51 does not return to the low-pressure economizers 21 (A1 to A4) of the gas turbine exhaust heat recovery device 501 and returns to the low-pressure economizer 21 (A0) of the auxiliary boiler 600.

Therefore, according to the sixth embodiment described above, for example, even in a case where all of the gas turbines 10 are in a non-operation state, or even in a case where all of the gas turbines 10 have the low load and all of the exhaust heat recovery boilers 20 cannot obtain the steam with the sufficient temperature, the gas turbine exhaust heat recovery device 501 can be preheated by the auxiliary boiler 600.

In the sixth embodiment, a case has been described where the steam is supplied from the auxiliary boiler 600. However, as in the fourth embodiment, the high-temperature water heated by the auxiliary boiler 600 may be supplied to the lower portion of the evaporators (the high-pressure evaporator 26, the medium-pressure evaporator 36, and the low-pressure evaporator 22) of the exhaust heat recovery boiler 20 so as to preheat each drum of the evaporators.

Seventh Embodiment

Next, a seventh embodiment of this invention will be described with reference to the drawings. A configuration of the seventh embodiment is different from a configuration according to the first modification example and the second modification example of the first embodiment described above in that all of the gas turbine exhaust heat recovery devices 501 are in an operation state. Therefore, the same reference numerals will be given to the same elements as those according to the first modification example and the second modification example of the first embodiment, and repeated description will be omitted. Description will be made with reference to FIGS. 15, 16, 22, and 23 in the modification example according to the fifth embodiment.

Figure 19:
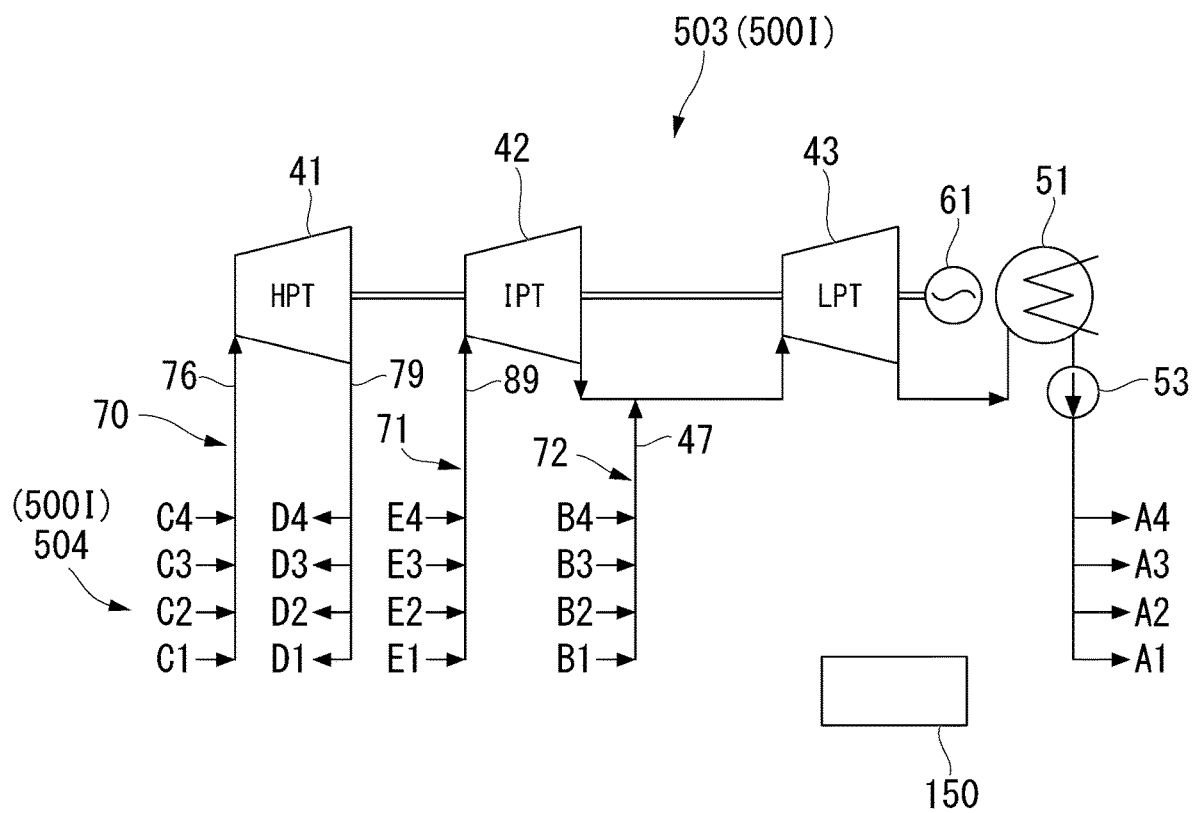
FIG. 19 is a view corresponding to FIGS. 4 and 5 of a steam-utilizing facility according to a seventh embodiment of this invention.

FIG. 19 is a view corresponding to FIGS. 4 and 5 of a steam-utilizing facility according to the seventh embodiment of this invention. As in the first and second modification examples according to the first embodiment described above, a gas turbine exhaust heat recovery plant 500I according to the seventh embodiment includes four gas turbine exhaust heat recovery devices 501 (not illustrated), the steam-utilizing facility 503, and the inter-device heat medium supply unit (steam merging pipeline) 504. As illustrated in FIG. 19, each steam of the four gas turbine exhaust heat recovery devices 501 is supplied to the steam-utilizing facility 5041 from the first supply unit 70 via the third supply unit 72. The inter-device heat medium supply unit 504 according to the seventh embodiment merges the steam respectively generated by the plurality of gas turbine exhaust heat recovery devices 501, and thereafter, guides the steam to the steam-utilizing facility 503.

Here, as in the first modification example and the second modification example according to the first embodiment described above, it means that C1 to C4 in FIG. 19 are connected to the second high-pressure superheater 28 of the mutually different gas turbine exhaust heat recovery devices 501, and it means that D1 to D4 are connected to the first reheater 31i of the mutually different gas turbine exhaust heat recovery devices 501. Similarly, it means that E1 to E2 are connected to the second reheater 32i of the mutually different gas turbine exhaust heat recovery devices 501, and it means that B1 to B4 are connected to the low-pressure superheater 37 of the mutually different gas turbine exhaust heat recovery devices 501. It means that A1 to A4 are connected to the low-pressure economizer 21 of the mutually different gas turbine exhaust heat recovery devices 501.

The gas turbine exhaust heat recovery plant 500I according to the seventh embodiment includes the control device 150. As illustrated in FIGS. 15 and 16, the control device 150 shifts the timing for starting up the four gas turbines 10 and the timing for increasing the load of the four gas turbines 10.

Therefore, according to the seventh embodiment, the timings for starting up the plurality of gas turbines 10 do not overlap each other. Accordingly, each temperature of the steam flowing into the high-pressure steam turbine 41, the steam flowing into the medium-pressure steam turbine 42, and the steam flowing into the low-pressure steam turbine 43 can be gently changed. As a result, the life consumption rate can be reduced by reducing the thermal stress on the high-pressure steam turbine 41, the medium-pressure steam turbine 42, and the low-pressure steam turbine 43. Therefore, the steam-utilizing facility 503 can have a longer life.

In the seventh embodiment described above, a case has been described where the timing for starting up the gas turbine 10 is shifted and the timing for increasing the load is shifted. However, either the timing for starting up the gas turbine 10 or the timing for increasing the load may be shifted. As in the gas turbine 1 and the gas turbine 2 in FIGS. 22 and 23, the timings for starting up the gas turbine and the timings for increasing the load may partially overlap each other. As in the gas turbine 3 and the gas turbine 4 in FIGS. 22 and 23, the timings for starting up the gas turbine and the timings for increasing the load may coincide with each other. However, as illustrated in FIGS. 15 and 16, if the gas turbine is started up or the load is increased so that the timings for starting up all of the gas turbines and the timings for increasing the load do not overlap each other at all, it is possible to most effectively suppress a sudden temperature change in the steam. Therefore, advantageous effects can be achieved in that the thermal stress is reduced to the maximum and the life consumption rate is reduced.

In the seventh embodiment, a case where the four gas turbine exhaust heat recovery devices 501 are provided has been described as an example. However, the number of the gas turbine exhaust heat recovery devices 501 is not limited to four as long as the plurality of gas turbine exhaust heat recovery devices 501 are provided. A case has been described where all of the gas turbine exhaust heat recovery devices 501 are in an operation state. However, the configuration according to the seventh embodiment is applicable as long as at least two of the gas turbine exhaust heat recovery devices 501 are in an operation state. The seventh embodiment may be used in proper combination with the respective embodiments and the respective modification example which are described above.

Eighth Embodiment

Next, an eighth embodiment of this invention will be described with reference to the drawings. The eighth embodiment is different from the seventh embodiment described above in that the plurality of steam-utilizing facilities are installed therein. Therefore, the same reference numerals will be given to the same elements as those according to the seventh embodiment, and repeated description will be omitted.

Figure 21:
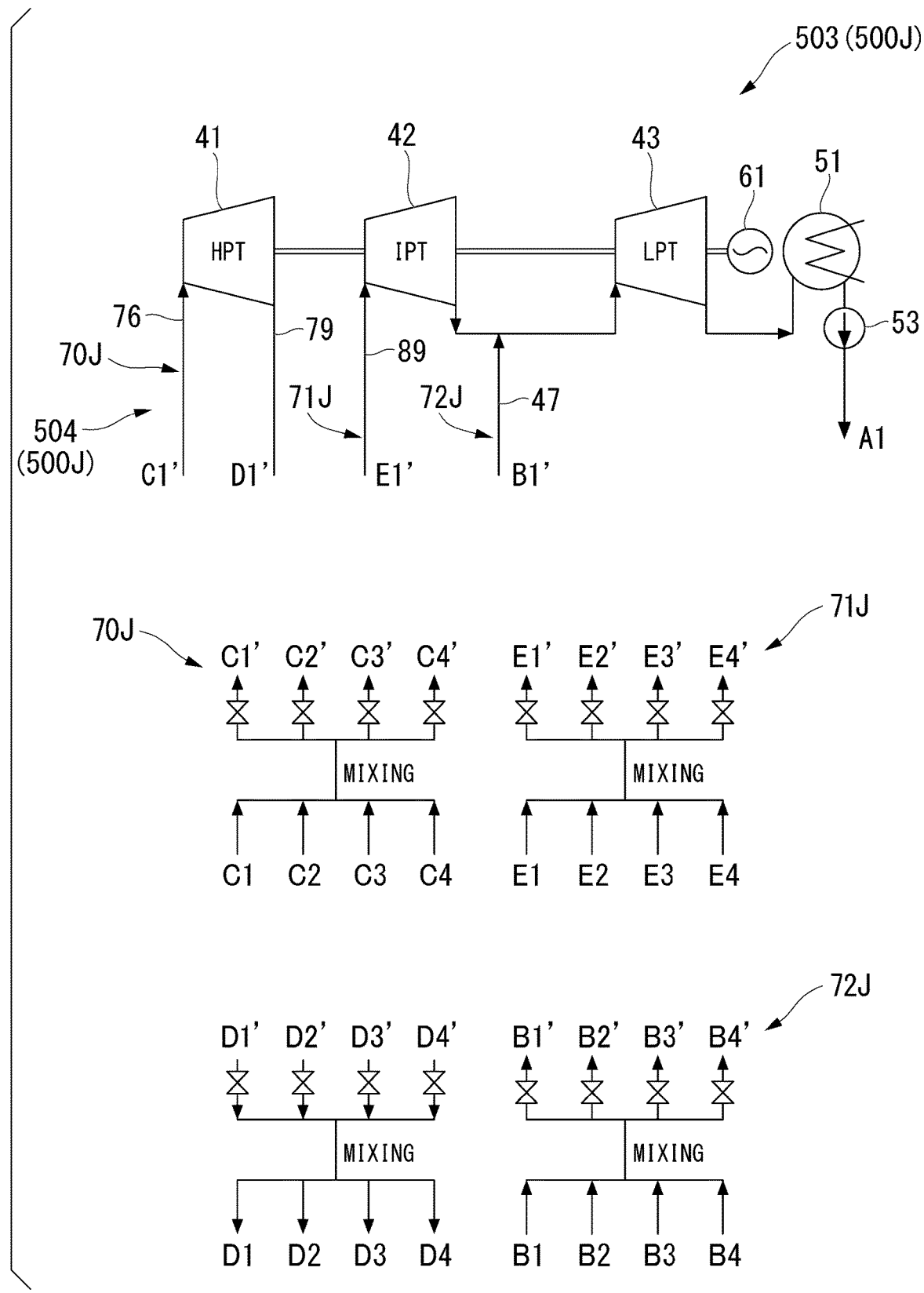
FIG. 21 is a view illustrating a schematic configuration of a steam-utilizing facility and a steam flow between a gas turbine exhaust heat recovery plant and the steam-utilizing facility according to a seventh embodiment of this invention.

FIG. 21 is a view illustrating a schematic configuration of the steam-utilizing facility and a steam flow between a gas turbine exhaust heat recovery plant and the steam-utilizing facility according to the seventh embodiment of this invention. As illustrated in FIG. 21, a gas turbine exhaust heat recovery plant 500J according to the eighth embodiment includes four gas turbine exhaust heat recovery devices 501 (not illustrated), as in the seventh embodiment described above. Furthermore, the gas turbine exhaust heat recovery plant 500J according to the eighth embodiment includes four steam-utilizing facilities 503 (hereinafter, referred to as a first steam-utilizing facility 503A to a fourth steam-utilizing facility 503D, if required).

The gas turbine exhaust heat recovery plant 500J according to the eighth embodiment includes the inter-device heat medium supply unit (steam merging pipeline) 504 that merges the steam respectively generated by the plurality of gas turbine exhaust heat recovery devices 501 and that distributes and guides the steam to the plurality of steam-utilizing facilities 503. The inter-device heat medium supply unit 504 according to the eighth embodiment merges the steam generated by the four gas turbine exhaust heat recovery devices 501 via a first supply unit 70J to a third supply unit 72J and thereafter, distributes and guides the steam to the four steam-utilizing facilities 503.

Here, it means that C1 to C4 in FIG. 21 are connected to the second high-pressure superheater 28 of the mutually different gas turbine exhaust heat recovery devices 501, and it means that D1 to D4 are connected to the first reheater 31i of the mutually different gas turbine exhaust heat recovery devices 501. Similarly, it means that E1 and E2 are connected to the second reheater 32i of the mutually different gas turbine exhaust heat recovery devices 501, and it means that B1 to B4 are connected to the low-pressure superheater 37 of the mutually different gas turbine exhaust heat recovery devices 501.

Furthermore, it means that C1' to C4' in FIG. 21 are connected to an inlet of the high-pressure steam turbine 41 of the mutually different steam-utilizing facilities 503, and it means that D1' to D4' are connected to an outlet of the high-pressure steam turbine 41 of the mutually different steam-utilizing facilities 503. Similarly, it means that E1' and E2' are connected to an inlet of the medium-pressure steam turbine 42 of the mutually different steam-utilizing facilities 503, and it means that B to B4' are connected to an outlet of the medium-pressure steam turbine 42 of the mutually different steam-utilizing facilities 503.

Therefore, according to the eighth embodiment, the steam respectively generated by the four gas turbine exhaust heat recovery devices 501 is merged, and thereafter, can be distributed to the four steam-utilizing facilities 503. Therefore, it is possible to effectively suppress a sudden temperature change in the steam to be supplied to the mutually different steam-utilizing facilities 503. As a result, the life consumption rate can be reduced by reducing the thermal stress in the steam-utilizing facility 503.

According to the eighth embodiment described above, a valve that opens and closes the steam flow path may be disposed in a pipeline which distributes the steam to the steam-utilizing facility 503 or a pipeline which collects the steam discharged from the steam-utilizing facility 503. In this manner, the plurality of steam-utilizing facilities 503 can be individually stopped. Accordingly, the steam-utilizing facilities 503 can be easily inspected or repaired.

In the eighth embodiment, a case where the generator 61 is disposed in each of the plurality of steam-utilizing facilities 503 has been described as an example. However, without being limited to this configuration, for example, each turbine shaft of the plurality of steam-utilizing facilities 503 may be connected to the gas turbine rotor 15 of the gas turbine 10 of the gas turbine exhaust heat recovery device 501.

In the eighth embodiment, a case including the four gas turbine exhaust heat recovery devices 501 and the four steam-utilizing facilities 503 has been described as an example. However, the number of the gas turbine exhaust heat recovery devices 501 and the steam-utilizing facilities 503 is not limited to four as long as the plurality of gas turbine exhaust heat recovery devices 501 and steam-utilizing facilities 503 are provided. Furthermore, a case where the number of the gas turbine exhaust heat recovery devices 501 and the number of the steam-utilizing facilities 503 coincide with each other has been described as an example. However, the number of the gas turbine exhaust heat recovery devices 501 and the number of the steam-utilizing facilities 503 may be different from each other. A case has been described where all of the gas turbine exhaust heat recovery devices 501 are in an operation state. However, the configuration according to the eighth embodiment is applicable as long as at least two of the gas turbine exhaust heat recovery devices 501 are in an operation state. The eighth embodiment may be used in proper combination with the respective embodiments and the respective modification example which are described above.

Furthermore, as in the seventh embodiment described above (FIGS. 15, 16, 22, and 23), according to the eighth embodiment, at least one of the timing for starting up the gas turbine 10 and the timing for increasing the load may be shifted. In this manner, as in the seventh embodiment, the thermal stress can be reduced, and the life consumption rate can be reduced by suppressing a sudden temperature change in the steam. As in the seventh embodiment, according to the eighth embodiment, as in the gas turbine 1 and the gas turbine 2 in FIGS. 22 and 23, the timings for starting up the gas turbine and the timings for increasing the load may partially overlap each other. As in the gas turbine 3 and the gas turbine 4 in FIGS. 22 and 23, the timings for starting up the gas turbine and the timings for increasing the load may coincide with each other. However, as illustrated in FIGS. 15 and 16, if the gas turbine is started up or the load is increased so that the timings for starting up all of the gas turbines and the timings for increasing the load do not overlap each other at all, it is possible to most effectively suppress a sudden temperature change in the steam. Therefore, advantageous effects can be achieved in that the thermal stress is reduced to the maximum and the life consumption rate is reduced.

Other Modification Example

This invention is not limited to the configurations of the above-described respective embodiments and modification examples, and includes those in which various modifications are added to the above-described respective embodiments and modification examples within the scope not departing from the gist of the invention. That is, the specific shapes or the configurations described in the embodiments are merely examples, and can be changed as appropriate.

Figure 20:
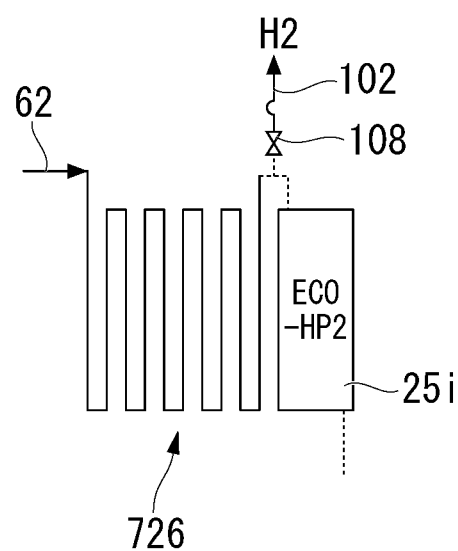
FIG. 20 is a view illustrating an evaporator according to another modification example of the embodiment of this invention.

FIG. 20 is a view illustrating an evaporator according to another modification example of the embodiment of this invention. For example, in the above-described respective embodiments and modification examples, a case where a natural circulation boiler is used as the evaporator has been described as an example. However, a once-through boiler may be applied to the high-pressure evaporator 726 illustrated in FIG. 20. The once-through boiler may also be applied to the medium-pressure evaporator 36 and the low-pressure evaporator 22.

The exhaust heat recovery boiler 20 and the steam-utilizing facility 503 are not limited to the configurations described as an example in the above-described respective embodiments and modification examples. The exhaust heat recovery boiler 20 may adopt any desired configuration as long as the steam can be generated utilizing the exhaust heat of the exhaust gas of the gas turbine 10. Similarly, the steam-utilizing facility 503 may adopt any desired configuration as long as the steam-utilizing facility 503 is driven utilizing the steam generated by the exhaust heat recovery boiler 20.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES 10, 10B: gas turbine
12: air compressor
13: combustor
14: turbine
15: gas turbine rotor
20: exhaust heat recovery boiler
21: low-pressure economizer
22: low-pressure evaporator
23: high-pressure pump
24: medium-pressure pump
25: first high-pressure economizer
25i: second high-pressure economizer
26: high-pressure evaporator
27: first high-pressure superheater
28: second high-pressure superheater
31i: first reheater
32i: second reheater
35: medium-pressure economizer
36: medium-pressure evaporator
37: low-pressure superheater
38: medium-pressure superheater, first medium-pressure superheater
39: stack
41: high-pressure steam turbine
42: medium-pressure steam turbine
43: low-pressure steam turbine
45, 45a, 45b: first low-pressure pipeline
46, 46a, 46b: second low-pressure pipeline
47: low-pressure inlet pipeline
48: valve
49: valve
50: valve
51: steam condenser
53: water supply pump
55: pipeline
56: valve
57: pipeline
58: valve
61: generator
62: pipeline
62: diverging pipeline
63: valve
64: valve
65: pipeline
67: first desuperheater
68: second desuperheater
70, 70D, 70E, 70F, 70H, 70J: first supply unit
71, 71D, 71E, 71F, 71H, 71J: second supply unit
72, 72D, 72E, 72F, 72H, 72J: third supply unit
73, 73D, 73F: condensate return unit
74, 74a, 74b: first high-pressure pipeline
75, 75a, 75b: second high-pressure pipeline
76: high-pressure inlet pipeline
77: valve
78: valve
79: outlet pipeline
80: pipeline
81: pipeline
82: valve
83: valve
84: pipeline
85: pipeline
87, 87a, 87b: first medium-pressure pipeline
88, 88a, 88b: second medium-pressure pipeline
89: medium-pressure inlet pipeline
90: valve
91: valve
92: pipeline
93: valve
94: pipeline
95: valve
96: pipeline
97: valve
101: pipeline
102: pipeline
103: pipeline
104: pipeline
105: pipeline
106: pipeline
107: valve
108: valve
109: valve
110: valve
111: valve
112: valve
115: pipeline
116: valve
120: pipeline
121: pipeline
122: valve
123: valve
124: valve
125: valve
126: pipeline
127: pipeline
128a: bypass pipeline
128b: bypass pipeline
129: valve
130: valve
131: valve
132: valve
133: pipeline
134: pipeline
135: valve
136: valve
150: control device
160: mixing pipeline
160a: first mixing pipeline
160b: second mixing pipeline
161: opening/closing valve
162: bypass line
163: opening/closing valve
164: opening/closing valve
165: bypass line
166: opening/closing valve
500A to 500I: gas turbine exhaust heat recovery plant
501: gas turbine exhaust heat recovery device
501A: first gas turbine exhaust heat recovery device
501B: second gas turbine exhaust heat recovery device 504, 504B, 504D, 504E, 504F, 504H: inter-device heat medium supply unit
600: auxiliary boiler
601: combustion chamber
602: boiler body
604: pipeline
605: valve
606: pipeline
607: valve
608: pipeline
609: valve
631: second medium-pressure superheater
632: third medium-pressure superheater
726: high-pressure evaporator

What is claimed is:

1. A gas turbine exhaust heat recovery plant comprising:
a plurality of gas turbine exhaust heat recovery devices, each gas turbine exhaust heat recovery device having a gas turbine, and
an exhaust heat recovery boiler for generating steam by recovering exhaust heat of the gas turbine;
a steam-utilizing facility that utilizes the generated steam; and
an inter-device heat medium supply unit capable of supplying a portion of water heated or a portion of the steam generated by at least one of the gas turbine exhaust heat recovery devices, to at least one of the other gas turbine exhaust heat recovery devices and the steam-utilizing facility, the inter-device heat medium supply unit including a valve and a pipeline,
wherein when a portion of the plurality of gas turbine exhaust recovery devices is in an operation state, a remaining portion of the plurality of gas turbine exhaust heat recovery devices is in a non-operation state,
the inter-device heat medium supply unit supplies the water heated by a gas turbine exhaust heat recovery device which is in the operation state, via the valve and the pipeline, to the exhaust heat recovery boiler of a gas turbine exhaust heat recovery device which is in the non-operation state, and
wherein the inter-device heat medium supply unit supplies the steam generated by the gas turbine exhaust heat recovery device which is in the operation state, to an evaporator of the exhaust heat recovery boiler of the gas turbine exhaust heat recovery device which is in the non-operation state, via a superheater or a reheater of the exhaust heat recovery boiler of the gas turbine exhaust heat recovery device which is in the non-operation state.

2. The gas turbine exhaust heat recovery plant according to claim 1,
wherein the exhaust heat recovery boiler of each gas turbine exhaust heat recovery device includes an evaporator, and the inter-device heat medium supply unit supplies at least one of the water heated and the steam evaporated by the evaporator belonging to the gas turbine exhaust heat recovery device which is in the operation state, to the evaporator of the gas turbine exhaust heat recovery device which is in the non-operation state.

3. The gas turbine exhaust heat recovery plant according to claim 2,
wherein the exhaust heat recovery boiler of each gas turbine exhaust heat recovery device includes a plurality of evaporators, and the inter-device heat medium supply unit supplies at least one of the water heated and the steam evaporated by a highest-pressure evaporator out of the plurality of evaporators belonging to the gas turbine exhaust heat recovery device which is in the operation state, to a highest-pressure evaporator of the plurality of evaporators of the gas turbine exhaust heat recovery device which is in the non-operation state.

4. The gas turbine exhaust heat recovery plant according to claim 1,
wherein each gas turbine exhaust heat recovery device includes a reheater for reheating the steam used by the steam-utilizing facility,
the steam-utilizing facility is driven by the steam, and
wherein the inter-device heat medium supply unit supplies the steam used by the steam-utilizing facility and reheated by the reheater of the gas turbine exhaust heat recovery device which is in the operation state, to the reheater of the gas turbine exhaust heat recovery device which is in the non-operation state.

5. The gas turbine exhaust heat recovery plant according to claim 1,
wherein the exhaust heat recovery boiler of each gas turbine exhaust heat recovery device includes a temperature sensor for measuring a temperature of the steam flowing in the exhaust heat recovery boiler, and includes a controller for controlling a degree of superheat of the steam flowing in an involved portion to be higher than 0 and to fall within a prescribed range, based on the steam temperature measured by the temperature sensor of the exhaust heat recovery boiler of the gas turbine exhaust heat recovery device which is in the non-operation state.

6. The gas turbine exhaust heat recovery plant according to claim 5,
wherein the temperature sensor is disposed between a superheater and an evaporator.

7. The gas turbine exhaust heat recovery plant according to claim 5,
wherein each gas turbine exhaust heat recovery device includes at least one of a valve for adjusting a steam flow rate and a desuperheater, and
wherein the controller operates at least one of the valve and the desuperheater, based on the steam temperature measured by the temperature sensor of the exhaust heat recovery boiler of the gas turbine exhaust heat recovery device which is in the non-operation state.

8. The gas turbine exhaust heat recovery plant according to claim 1,
wherein the inter-device heat medium supply unit includes a mixing pipeline that is connected to an intermediate portion of a steam system of the plurality of gas turbine exhaust heat recovery devices, and that mixes the steam of the plurality of gas turbine exhaust heat recovery devices with each other, and that redistributes the mixed steam to each of the gas turbine exhaust heat recovery devices.

9. The gas turbine exhaust heat recovery plant according to claim 8, further comprising:
a controller that controls the plurality of gas turbine exhaust heat recovery devices,
wherein the controller increases a load of a plurality of the gas turbines at an interval so that each of the gas turbines has a different timing for a load increase.

10. The gas turbine exhaust heat recovery plant according to claim 9,
wherein the load increase is starting up each of the gas turbines, and the controller starts up the plurality of gas turbines at an interval.

11. The gas turbine exhaust heat recovery plant according to claim 1, further comprising:
- a steam merging pipeline that introduces the steam to one or a plurality of the steam-utilizing facilities after merging the steam generated by the plurality of gas turbine exhaust heat recovery devices; and
- a controller that controls the plurality of gas turbine exhaust heat recovery devices,
- wherein the controller increases a load of a plurality of the gas turbines at an interval so that each of the plurality of gas turbines has a different timing for a load increase.

12. The gas turbine exhaust heat recovery plant according to claim 11,
- wherein the load increase is starting up each of the gas turbines, and the control device starts up the plurality of gas turbines at an interval.

13. The gas turbine exhaust heat recovery plant according to claim 1, further comprising:
- a steam merging pipeline that distributes and introduces the steam to a plurality of the steam-utilizing facilities after merging the steam generated by the plurality of gas turbine exhaust heat recovery devices.

* * * * *